United States Patent
Cho et al.

(10) Patent No.: US 9,596,048 B2
(45) Date of Patent: Mar. 14, 2017

(54) METHOD FOR SHARING OPTICAL FIBER FOR CLOUD-BASED WIRED AND WIRELESS ACCESS NETWORK, AND SYSTEM AND APPARATUS FOR SAME

(71) Applicants: SK TELECOM CO., LTD., Seoul (KR); HFR, INC., Seongnam-si, Gyeonggi-do (KR)

(72) Inventors: Beum-Geun Cho, Yongin-si (KR); Myung-Hun Song, Yongin-si (KR); Sungjin Byun, Yongin-si (KR); Sun-Ik Lee, Yongin-si (KR); Sang-Woo Kim, Yongin-si (KR); Jinsoo Sung, Seongnam-si (KR); Jong-Yeong Lim, Goyang-si (KR); Chan Park, Seoul (KR); Eun-Ho Lee, Goyang-si (KR)

(73) Assignees: SK TELECOM CO., LTD., Seoul (KR); HFR, INC., Seongnam-si, Gyeonggi-do (KR)

( * ) Notice: Subject to any disclaimer, the term of this patent is extended or adjusted under 35 U.S.C. 154(b) by 308 days.

(21) Appl. No.: 14/347,111

(22) PCT Filed: Sep. 26, 2012

(86) PCT No.: PCT/KR2012/007768
§ 371 (c)(1),
(2) Date: Mar. 25, 2014

(87) PCT Pub. No.: WO2013/048119
PCT Pub. Date: Apr. 4, 2013

(65) Prior Publication Data
US 2014/0233591 A1 Aug. 21, 2014

(30) Foreign Application Priority Data

Sep. 26, 2011 (KR) .................. 10-2011-0096867
Jul. 25, 2012 (KR) .................. 10-2012-0081043

(51) Int. Cl.
H04B 13/02 (2006.01)
H04J 14/02 (2006.01)
H04B 10/27 (2013.01)

(52) U.S. Cl.
CPC ......... *H04J 14/0267* (2013.01); *H04B 10/27* (2013.01); *H04J 14/0254* (2013.01);
(Continued)

(58) Field of Classification Search
CPC .............. H04J 14/0254; H04J 14/0227; H04J 14/0241; H04J 14/0283; H04J 14/021;
(Continued)

(56) References Cited

U.S. PATENT DOCUMENTS 5,579,379 A * 11/1996 D'Amico .............. H04M 15/07
379/111
6,708,000 B1 * 3/2004 Nishi .................. H04J 14/0227
398/1
(Continued)

FOREIGN PATENT DOCUMENTS

CA      EP 0977394 A2 * 2/2000 .......... H04J 14/0227
EP         0977394 A2     2/2000
(Continued)

OTHER PUBLICATIONS

Japanese Office Action dated Jul. 22, 2015.
(Continued)

*Primary Examiner* — Ken N Vanderpuye
*Assistant Examiner* — Abbas H Alagheband
(74) *Attorney, Agent, or Firm* — Hauptman Ham, LLP

(57) ABSTRACT

A system for sharing an optical fiber for a cloud-based wired and wireless access network, includes: a centralization device to generate summing signals by respectively summing multi-channel optical signals input from a wireless donor unit group and by summing multi-channel wired
(Continued)

signals input from a wired donor unit group or generate wavelength-converted signals by wavelength-converting the multi-channel optical signals or the multi-channel wired signals, multiplex the summing signals or the wavelength-converted signals, and distribute the summing signals or the wavelength-converted signals to a plurality of devices connected to the centralization device via a shared optical fiber; and a distribution device group to generate corresponding optical signals by demultiplexing the summing signals or the wavelength-converted signals in units of wavelengths, and transmit the corresponding optical signals or the multi-channel wired signals to a wireless remote unit group and/or a wired remote unit group via a preset optical fiber.

6 Claims, 12 Drawing Sheets

(52) U.S. Cl.
CPC ....... *H04J 14/0227* (2013.01); *H04J 14/0241* (2013.01); *H04J 14/0283* (2013.01); *H04J 14/0287* (2013.01)

(58) Field of Classification Search
CPC .. H04J 14/0246; H04J 14/025; H04J 14/0282; H04J 11/00; H04J 11/003; H04J 14/0267; H04J 14/0286; H04J 14/0293; H04J 14/0295; H04W 88/085; H04W 24/00; H04B 7/02; H04B 7/04; H04B 7/0456; H04B 1/0003; H04B 1/04; H04B 7/024; H04B 10/27; H04L 12/24; H04L 41/0816; H04L 5/00; H04L 5/0073; H04L 5/0023
USPC .................... 398/79, 116; 370/254, 329, 330
See application file for complete search history.

(56) References Cited

U.S. PATENT DOCUMENTS

| | | | | | |
|---|---|---|---|---|---|
| 7,043,159 | B1* | 5/2006 | Solheim | .............. | H04J 14/0206 398/59 |
| 7,623,789 | B2* | 11/2009 | Oberg | ................ | H04J 14/0208 398/59 |
| 8,750,161 | B1* | 6/2014 | Matthews | ............. | H04W 40/02 370/254 |
| 9,131,289 | B2* | 9/2015 | Cvijetic | ............. | H04Q 11/0066 |
| 2002/0150098 | A1* | 10/2002 | Sharony | ................ | H04L 12/189 370/390 |
| 2003/0039010 | A1* | 2/2003 | Akimoto | ................ | H04B 10/40 398/139 |
| 2003/0128984 | A1* | 7/2003 | Oberg | ................ | H04J 14/0208 398/83 |
| 2003/0179783 | A1* | 9/2003 | Uekama | ................ | H04J 3/1611 370/535 |
| 2004/0131354 | A1* | 7/2004 | Kim | ..................... | H04J 14/0212 398/3 |
| 2005/0007993 | A1* | 1/2005 | Chambers | ............... | H04L 12/66 370/349 |
| 2005/0063396 | A1* | 3/2005 | Yu | ........................... | H04J 3/085 370/401 |
| 2006/0094470 | A1* | 5/2006 | Wake | .................. | H04W 88/085 455/562.1 |
| 2007/0077066 | A1* | 4/2007 | Nakamoto | .......... | H04J 14/0221 398/33 |
| 2008/0019696 | A1* | 1/2008 | Choi | .................... | H04J 14/0227 398/83 |
| 2008/0025208 | A1* | 1/2008 | Chan | ........................ | H04L 12/42 370/217 |
| 2008/0063397 | A1* | 3/2008 | Hu | ........................ | H04J 14/0282 398/43 |
| 2008/0207200 | A1* | 8/2008 | Fein | ........................ | H04B 1/38 455/426.1 |
| 2010/0111526 | A1* | 5/2010 | Bader | ................ | H04Q 11/0005 398/45 |
| 2010/0316163 | A1* | 12/2010 | Forenza | ................ | H04B 7/024 375/296 |
| 2011/0044193 | A1* | 2/2011 | Forenza | ................ | H04B 7/024 370/252 |
| 2012/0135724 | A1* | 5/2012 | Lewis | .................... | H04W 92/20 455/422.1 |
| 2012/0275779 | A1* | 11/2012 | Zhang | ................ | H04J 14/0295 398/3 |
| 2014/0173652 | A1* | 6/2014 | Patel | ..................... | H04N 21/812 725/34 |

FOREIGN PATENT DOCUMENTS

| | | |
|---|---|---|
| EP | 2192712 A1 | 2/2010 |
| JP | 2005-79826 A | 3/2005 |
| KR | 1020100050024 A | 5/2010 |

OTHER PUBLICATIONS

European Office Action dated Jul. 7, 2015.
International Search Report mailed Dec. 26, 2012 for PCT/KR2012/007768.

* cited by examiner

METHOD FOR SHARING OPTICAL FIBER FOR CLOUD-BASED WIRED AND WIRELESS ACCESS NETWORK, AND SYSTEM AND APPARATUS FOR SAME

CROSS-REFERENCE TO RELATED APPLICATION

The instant application is a continuation of PCT/KR2012/007768, filed Sep. 26, 2012, which is based on and claims priority to Korean Patent Applications No. 10-2011-0096867, filed on Sep. 26, 2011, and No. 10-2012-0081043, filed on Jul. 25, 2012, respectively. The disclosures of above-listed applications are hereby incorporated by reference herein in their entirety.

TECHNICAL FIELD

The present disclosure relates to sharing an optical fiber for a cloud-based wired and wireless access network.

BACKGROUND

The statements in this section merely provide background information related to the present disclosure and do not constitute prior art.

Recently, various communication services using a network have been provided due to the remarkable development of computer and electronic communication technologies. Accordingly, wired and wireless communication services have been evolving into multimedia communication services for transmitting data such as circuit data and packet data, as well as voice services.

Meanwhile, data traffic has recently increased, and will continue to do so. To reduce traffic overhead caused by increasing data traffic, efforts have been made to separate a network into an upper group and a lower group to centralize the upper group and deploy the lower group in distributed areas requiring services. In other words, a cloud-based wired and wireless access network technology for efficiently using centralized resources has been developed. To apply such a cloud-based wired and wireless access network technology, a connection between a centralization group and a distribution device group is necessary. However, the connection between the centralization group and the distribution device group requires excessive optical fibers and therefore exacts significant cost.

SUMMARY

In accordance with some embodiments of the present disclosure, a system for sharing an optical fiber for a cloud-based wired and wireless access network comprises a centralization device and a distribution device. The centralization device is configured to generate summing signals by respectively summing multi-channel optical signals input from a wireless donor unit group and by summing multi-channel wired signals input from a wired donor unit group or generate wavelength-converted signals by wavelength-converting the optical signals or the wired signals, multiplex either the summing signals or the wavelength-converted signals in units of wavelengths, and distribute either the summing signals or the wavelength-converted signals to a plurality of devices connected to the centralization device by shared optical fibers. The distribution device group is configured to generate optical signals by demultiplexing the summing signals or the wavelength-converted signals in units of wavelengths, and transmit the corresponding optical signals or the multi-channel wired signals to at least one of a wireless remote unit group and a wired remote unit group via a preset optical fiber.

In accordance with some embodiments of the present disclosure, a centralization device comprises a first transmission rate converter configured to determine transmission rates of multi-channel optical signals input from a wireless donor unit group and transmission rates of multi-channel wired signals input from a wired donor unit group, and generate summing signals by respectively summing the multi-channel optical signals and summing the multi-channel wired signals based on the transmission rates of the multi-channel optical signals and the transmission rates of the multi-channel wired signals. The centralization device further comprises a first wavelength division multiplexer configured to separate the summing signals in units of wavelengths or multiplex the summing signals separated in units of wavelengths, control to distribute the summing signals to a distribution device connected to the first wavelength division multiplexer via a shared optical fiber, and cause the distribution device to perform a signal processing using the summing signals.

In accordance with some embodiments of the present disclosure, a distribution device comprises a second wavelength division multiplexer configured to receive summing signals from a centralization device connected to the distribution device by a shared optical fiber and demultiplex the summing signals in units of wavelengths; and a second transmission rate converter configured to convert the summing signals into optical signals and transmit the optical signals to at least one group of a wireless remote unit group and a wired remote unit group via a preset optical fiber according to transmission rate.

In accordance with some embodiments of the present disclosure, a system is configured to perform a method for sharing an optical fiber for a cloud-based wired and wireless access network. The method comprises generating, by a centralization device, summing signals by respectively summing multi-channel optical signals input from a wireless donor unit group and multi-channel wired signals input from a wired donor unit group or generating wavelength-converted signals by wavelength-converting the multi-channel optical signals or the multi-channel wired signals, multiplexing, by the centralization device, either the summing signals or the wavelength-converted signals in units of wavelengths, and distributing, by the centralization device, either the summing signals or the wavelength-converted signals to a plurality of devices connected to the centralization device via a shared optical fiber. And the method further comprises generating, by a distribution device, corresponding optical signals by demultiplexing in units of wavelengths the summing signals or the wavelength-converted signals received from the centralization device, and transmitting, by the distribution device, the corresponding optical signals or the multi-channel wired signals to at least one of a wireless remote unit group and a wired remote unit group via a preset optical fiber.

DETAILED DESCRIPTION

Figure 1:
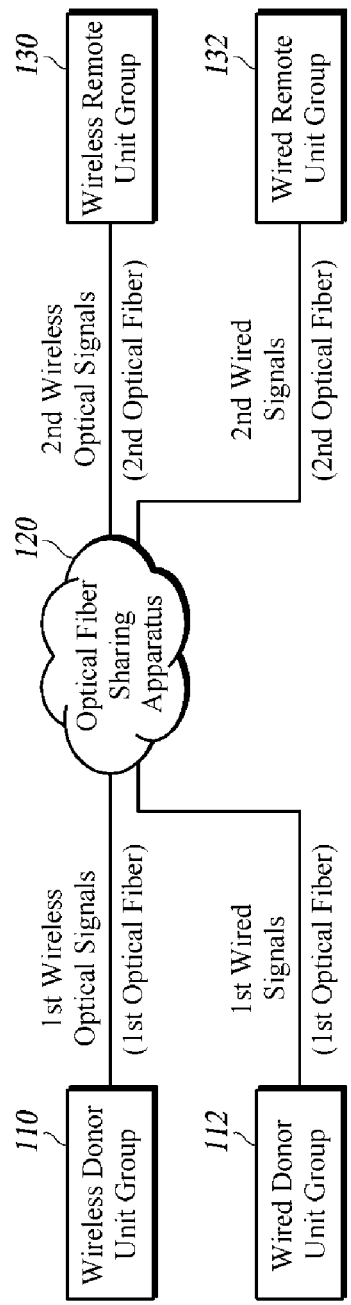
FIG. 1 is a schematic block diagram of an optical fiber sharing system for a cloud-based wired and wireless access network according to at least one embodiment of the present disclosure.

Hereinafter, at least one embodiment of the present disclosure will be described in detail with reference to the accompanying drawings.

The present disclosure provides an optical fiber sharing method for establishing, using a minimum of optical fibers, a cloud-based wired and wireless access network used to connect centralized wired and wireless donor unit groups and distributed wired and wireless remote unit groups, and a system and apparatus therefore. In an exemplary embodiment of the present disclosure, a centralization device generates a summing signal by summing multi-channel wireless communication signals or multi-channel wired communication signals. The centralization device also generates wavelength-converted signals by converting the wavelengths of the multi-channel wireless communication signals or multi-channel wired communication signals; transmits electro-optically converted signals to a distribution device group by electro-optically converting the multi-channel wireless communication signals or the multi-channel wired communication signals; and allocates the summing signal, the wavelength-converted signals, or the electro-optically converted signals to each device in the distribution device group. The distribution device group transmits, to the centralization device, the summing signal generated by summing the multi-channel wireless communication signals or the multi-channel wired communication signals or the wavelength-converted generated by converting the wavelengths of the multi-channel wireless communication signals or multi-channel wired communication signals. The distribution device group also transmits, to the centralization device, the electro-optically converted signals generated by electro-optical conversion of the multi-channel wireless communication signals or the multi-channel wired communication signals.

A first wireless summing signal, a first wired summing signal, a second summing signal, a second summing signal', a third summing signal, a third summing signal', a fourth wireless summing signal, and a fourth wired summing signal, described in at least one embodiment of the present disclosure, are defined as follows. The first wireless summing signal refers to a signal summed in a first wireless transmission rate converter 320 of a centralization device 210 and the first wired summing signal refers to a signal summed in a first wired transmission rate converter 350 of the centralization device 210. The second summing signal refers to a multiplexed signal transmitted from a first dense wavelength division multiplexer 520 of the centralization device 210 to a first coarse wavelength division multiplexer 510 of the centralization and the second summing signal' refers to a multiplexed signal in the first coarse wavelength division multiplexer 510 of the centralization device 210. The third summing signal refers to a demultiplexed signal transmitted from a second coarse wavelength division multiplexer 610 of a distribution device 220 to a second dense wavelength division multiplexer 620 of the distribution device 220 and the third summing signal' corresponds to a second summing signal' selected by an optical switch of a shared optical fiber. The fourth wireless summing signal and the fourth wired summing signal refer to signals transmitted to a second wireless transmission rate converter 430 and a second wired transmission rate converter 450 of the distribution device 220, respectively, among signals demultiplexed in the second dense wavelength division multiplexer 620.

A first wireless optical signal, a second wireless optical signal, a third wireless optical signal, and a fourth wireless optical signal, described in at least one embodiment of the present disclosure, are defined as follows. The first wireless optical signal refers to an optical signal transmitted between a wireless donor unit group 110 and an optical fiber sharing apparatus 120. The second wireless optical signal refers to an optical signal transmitted between the optical fiber sharing apparatus 120 and a wireless remote unit group 130. The third wireless optical signal refers to a signal generated by converting the wavelength of the first wireless optical signal in a first wavelength converter 310 of the centralization device 210. The fourth wireless optical signal refers to a signal generated by wavelength converting an optical signal received by the second coarse wavelength division multiplexer 610.

A first wired signal, a first wired signal', a second wired signal, a third wired optical signal, a fourth wired optical signal, and a fourth wired signal', described in at least one embodiment of the present disclosure, are defined as follows. The first wired signal refers to a wired signal transmitted between a wired donor unit group 112 and the optical fiber sharing apparatus 120. The first wired signal' refers to a signal generated by processing a signal transmitted and received by a plurality of devices included in the wired donor unit group 112 into a standard signal. The second wired signal refers to a wired signal transmitted between the optical fiber sharing apparatus 120 and a wired remote unit group 132. The third wired optical signal refers to a signal generated by converting the first wired signal' into an optical signal. The fourth wired optical signal refers to a wired optical signal input to the distribution device 220 and the fourth wired signal' refers to a standard-processed fourth wired optical signal and a standard processed fourth wired summing signal.

FIG. 1 is a schematic block diagram of an optical fiber sharing system for a cloud-based wired and wireless access network according to at least one embodiment of the present disclosure.

The optical fiber sharing system for the cloud-based wired and wireless access network according to at least one embodiment of the present disclosure includes a wireless donor unit group 110, a wired donor unit group 112, an optical fiber sharing apparatus 120, a wireless remote unit group 130 and a wired remote unit group 132. Although the optical fiber sharing system for use in the cloud-based wired and wireless access network according to at least one embodiment of the present disclosure has been described as including only the wireless donor unit group 110, the wired donor unit group 112, the optical fiber sharing apparatus 120, the wireless remote unit group 130 and the wired remote unit group 132, this is merely for exemplary description of the technical spirit of at least one embodiment of the present disclosure. Therefore, those skilled in the art will appreciate that various modifications, additions, and substitutions of the components included in the optical fiber sharing system for the cloud-based wired and wireless access network are possible, without departing from the characteristics of at least one embodiment of the present disclosure.

The wireless donor unit group 110 may be installed in a transmitter apparatus (device) of a wireless communication network and the wired donor unit group 112 may be installed in a transmitter apparatus (device) of a wired communication network. For example, the wireless donor unit group 110 converts signals received from a transmitter base station into optical signals by using different wavelengths. Next, the wireless donor unit group 110 combines the optical signals into one through multiplexing of a coarse wavelength division multiplexing (CWDM) scheme and transmits the combined optical signal via a single optical fiber to the wireless remote unit group 130 installed in a receiver base station of a mobile communication network. Meanwhile, the wired donor unit group 112 converts wired signals of different sectors received from the transmitter apparatus into wired signals by using different wavelengths. Thereafter, the wired donor unit group 112 combines the wired signals into one through multiplexing of the CWDM scheme and transmits the combined wired signal via a single optical fiber to the wired remote unit group 132 installed in a receiver apparatus of a wired communication network.

In addition, the wireless donor unit group 110 separates an optical signal received from the wireless remote unit group 130 via each optical fiber into a plurality of optical signals by applying demultiplexing of the CWDM scheme. Then, the wireless donor unit group 110 converts the separated optical signals into radio frequency (RF) signals and transmits the converted RF signals to the transmitter apparatus. Meanwhile, the wired donor unit group 112 receives a wired signal from the wired remote unit group 132 via each optical fiber. The wired donor unit group 112 separates the wired signal into a plurality of wired signals by applying demultiplexing of the CWDM scheme and transmits the separated wired signals to the transmitter apparatus.

Meanwhile, the wireless donor unit group 110 receives signals from the transmitter base station of the mobile communication network and transmits a plurality of optical signals processed in an optical transmission and reception processor to the wireless remote unit group 130 via a single optical fiber. The wireless donor unit group 110 separates optical signals received from the wireless remote unit group 130 and transmits the separated optical signals to the optical transmission and reception processor. In this way, the wireless donor unit 110 performs CWDM multiplexing/demultiplexing. The wireless donor unit group 110 is desirably a wireless communication unit. The wired donor unit group 112 receives wired signals from the transmitter apparatus of the wired communication network and converts the wired signals into optical signals by using different wavelengths. The wired donor unit group 112 combines the optical signals into one and transmits the combined optical signal to the wired remote unit group 132 via one optical fiber. The wired donor unit group 112 converts optical signals received from the wired remote unit group 132 into wired signals and transmits the wired signals to the transmitter apparatus. Thus, the wired donor unit group may perform CWDM multiplexing/demultiplexing. The wired donor unit group 112 refers to a wired communication unit including Ethernet, E1, Ethernet PON (E-PON), Gigabit PON (G-PON) and voice packet. To distinguish between the wireless donor unit group 110 which is a wireless communication unit, and the wired donor unit group 112 which is a wired communication unit, an optical fiber connected to the wireless donor unit group 110 is defined as a first optical fiber and an optical signal transmitted via the first optical fiber is defined as a first wireless optical signal. On the other hand, since an optical fiber connected to the wired donor unit group 112 is the same as the optical fiber connected to the wireless donor unit group, the optical fiber connected to the wired donor unit group 112 is defined as the first optical fiber and a wired signal transmitted via the first optical fiber is defined as a first wired signal.

The optical fiber sharing apparatus 120 is connected between the wireless donor unit group 110 and the wireless remote unit group 130. The optical fiber sharing apparatus 120 refers to an apparatus for summing or wavelength-converting multi-channel optical signals or wired signals generated from the wireless donor unit group 110, the wired donor unit group 112, the wireless remote unit group 130 or the wired remote unit group 132. The optical fiber sharing apparatus 120 operates based on optical communication to achieve ultra-high speed communication. As an example of such ultra-high speed communication is fiber-to-the-home (FTTH). FTTH uses a time division multiplexing scheme or a wavelength division multiplexing (WDM) scheme.

The optical fiber sharing apparatus 120 according to at least one embodiment of the present disclosure generates a summing signal by summing multi-channel optical signals or wired signals input from the wireless donor unit group 110 or the wired donor unit group 112 or generates wavelength-converted signals by wavelength-converting the optical signals or the wired signals. The optical fiber sharing apparatus 120 multiplexes either the summing signal or the wavelength-converted signals in units of wavelengths and distributes either the summing signal or the wavelength-converted signals to a plurality of devices connected thereto via optical fibers. The optical fiber sharing apparatus 120 generates demultiplexed optical signals or wired signals by demultiplexing the distributed summing signal or wavelength-converted signals in units of wavelengths. The optical fiber sharing apparatus 120 transmits the demultiplexed optical signals or wired signals to the wireless remote unit group 130 or the wired remote unit group 132 via a preset optical fiber. The optical fiber sharing apparatus 120 will be described in detail with reference to FIGS. 2 to 6.

Hereinafter, an example to which the optical fiber sharing apparatus 120 is applied will be described. Since the optical fiber sharing apparatus 120 concentrates the wireless donor unit group 110 by regional centers, it is easy to control a base station and operation efficiency can be increased. Wireless data demand varying with a region/duration can be accommodated since cloud donor unit resources are flexibly distributed to remote units by using a cloud-based wired and wireless access network to which cloud computing technology is applied. Cloud computing refers to a computer environment in which information is permanently stored on a server on the Internet and is temporarily stored in a desktop computer, a tablet computer, a laptop PC, a netbook, a smartphone, etc. Cloud computing means a computer environment access network for storing all user information in a server on the Internet and causing users to use the information through various information technology (IT) devices anywhere at any time. Meanwhile, the optical fiber sharing apparatus 120 concentrates the wired donor unit group 112 by regional centers to facilitate control of a wired apparatus and increase operational efficiency.

As an interface for connecting the wireless donor unit group 110 and the wireless remote unit group 130 by the optical fiber sharing apparatus 120, a common public radio interface (CPRI) may be used. CPRI refers to a specification defining access of the optical fiber sharing apparatus 120 and a controller of the wireless donor unit group 110 and access of the optical fiber sharing apparatus 120 and a controller of the wireless remote unit group 130. A CPRI line bit rate used in the optical fiber sharing apparatus 120 may include, for example, CPRI line bit rate option 3: 2457.6 Mbits/s (4×614.4 Mbits/s), a CPRI line bit rate option 4: 3072.0 Mbits/s (5×614.4 Mbits/s), a CPRI line bit rate option 5: 4915.2 Mbits/s (8×614.4 Mbits/s) and a CPRI line bit rate option 6: 6144.0 Mbits/s (10×614.4 Mbits/s).

In addition, as an interface for connecting the wireless donor unit group 110 and the wireless remote unit group 130 by the optical fiber sharing apparatus 120, an open base station architecture initiative (OBSAI) interface may be used. OBSAI defines a detailed specification and a basic module structure of an interior interface between modules by composing an open specification for a base station structure. When the OBSAI is used, a cost saving effect can be expected from flexibilities in a technical specification and a module structure demanded by a future generation base station. An OBSAI line bit rate used in an optical fiber sharing apparatus 120 may include 3072.0 Mbits/s and 6144.0 Mbits/s.

A wireless service applied to the optical fiber sharing apparatus 120 includes, for example, wideband code division multiple access (W-CDMA), high speed uplink packet access (HSUPA), long term evolution (LTE), or LTE-advanced (LTE-A). When the optical fiber sharing apparatus 120 is configured in a network providing such a service through a CPRI or OBSAI interface, a stable network can be configured.

The wireless remote unit group 130 or the wired remote unit group 132 may be installed in a receiver side base station of a mobile communication network. The wireless remote unit group 130 and the wired remote unit group 132 separates optical signals received from the wireless donor unit group 110 and the wired donor unit group 112 via optical fibers into a plurality of optical signals through demultiplexing of a CWDM scheme. The wireless remote unit group 130 and the wired remote unit group 132 transmit respective optical signals to a remote unit (RU) of each wireless remote group and an optical line terminator (OLT) of each wired remote group, respectively. The wireless remote unit group 130 and the wired remote unit group 132 convert a plurality of optical signals received from the RU of the wireless remote group and the OLT of the wired remote group into optical signals of different wavelengths. The wireless remote unit group 130 or the wired remote unit group 132 combines a plurality of optical signals into one through multiplexing of the CWDM scheme and transmits the combined optical signal to the wireless donor unit group 110 or the wired donor unit group 112 via one optical fiber. The wired remote unit group 132 is desirably a communication unit.

Meanwhile, the wired remote unit group 132 may be a wired communication unit. The wired remote unit group 132 refers to a wired communication unit including Ethernet, E1, Ethernet passive optical network (E-PON) and gigabit passive optical network (G-PON). To distinguish between the wireless remote unit group 130 and the wired remote unit group 132, an optical fiber connected to the wireless remote unit group 130 is defined as a second optical fiber and an optical signal transmitted through the second optical fiber is defined as a second wireless optical signal. A fiber connected to the wired remote unit group 132 is defined as a second optical fiber and a wired signal transmitted through the second optical fiber is defined as a second wired signal.

Figure 2:
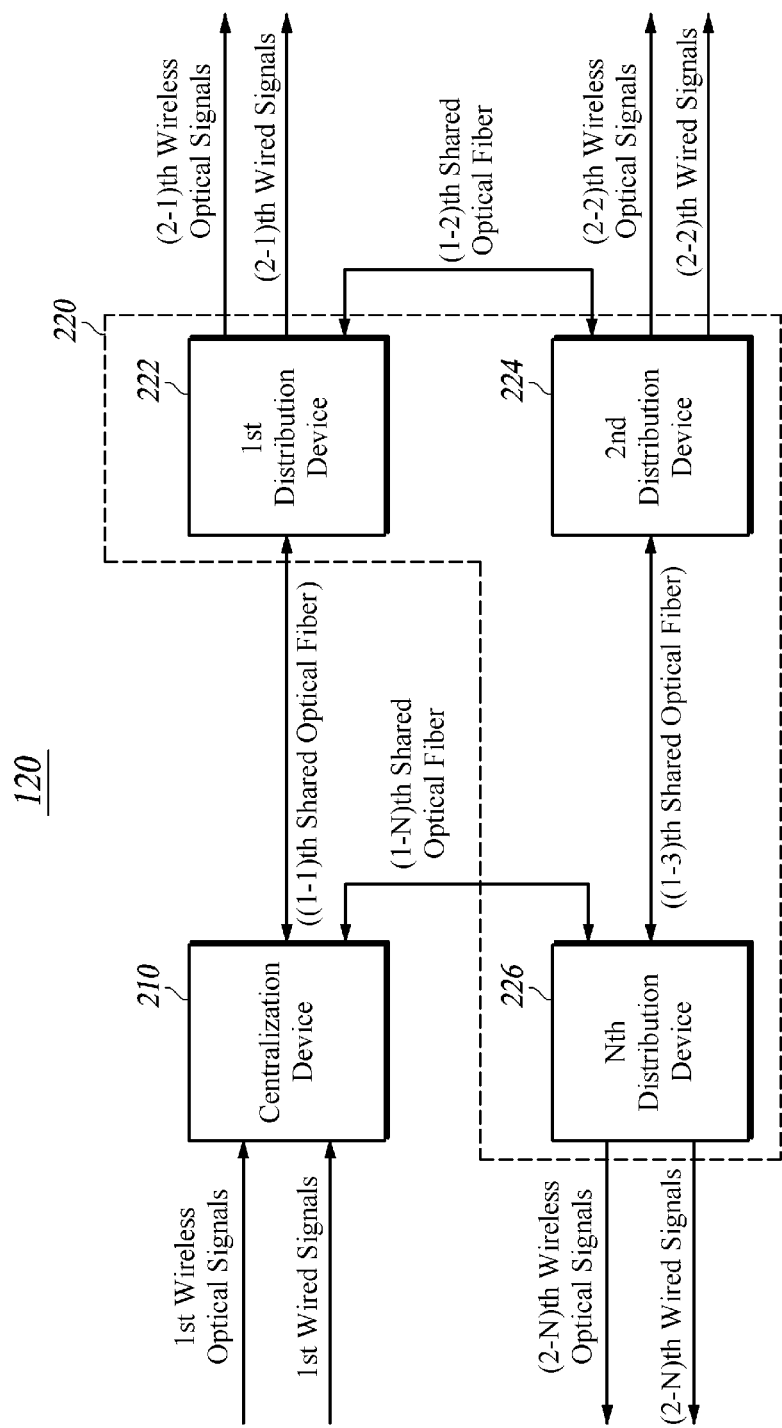
FIG. 2 is a schematic block diagram of an optical fiber sharing system according to at least one embodiment of the present disclosure.

FIG. 2 is a schematic block diagram of an optical fiber sharing apparatus according to at least one embodiment of the present disclosure.

The optical fiber sharing apparatus 120 according to at least one embodiment of the present disclosure includes a centralization device 210 and a distribution device 220. Although the optical fiber sharing apparatus 120 according to at least one embodiment of the present disclosure has been described as including only the centralization device 210 and the distribution device 220, this is merely for exemplary description of the technical idea of at least one embodiment of the present disclosure. Therefore, those skilled in the art will appreciate that various modifications, additions and substitutions of the components included in the optical fiber sharing apparatus 120 are possible, without departing from the characteristics of at least one embodiment of the present disclosure.

The centralization device 210 generates a summing signal by summing multi-channel optical signals received from the wireless donor unit group 110 or multi-channel wired signals received from the wired donor unit group 112, or generates wavelength-converted signals by wavelength converting the optical signals or the wired signals. The centralization device 210 multiplexes the summing signal and the wavelength-converted signals in units of wavelengths and distributes the summing signal and the wavelength-converted signals to the distribution device 220 connected thereto by sharing optical fibers.

An operation process of the centralization device 210 will now be described in more detail. The centralization device 210 according to at least one embodiment of the present disclosure generates a summing signal by summing multi-channel optical signals received from the wireless donor unit group 110 or multi-channel wired signals received from the wired donor unit group 112. The centralization device 210 generates wavelength-converted signals by converting the wavelengths of the optical signals or the wired signals received from the wireless donor unit group 110 or the wired donor unit group 112 into other wavelengths. The centralization device 210 multiplexes the summing signal and the wavelength-converted signals in units of wavelengths and distributes the summing signal and wavelength-converted signals to the distribution device 220 connected thereto by sharing optical fibers. In an operation of the centralization device 210 for distributing the summing signal and the wavelength-converted signals, the centralization device 210 may distribute the summing signal and the wavelength-converted signals to N sharing optical fibers by using an optical divider. Signals in a signal processing process performed by the centralization device 210 will now be described in detail. The centralization device 210 generates a first wireless summing signal by summing first wireless optical signals, which are optical signals received from the wireless donor unit group 110, or generates a first wired summing signal by summing first wired signals, which are wired signals received from the wired donor unit group 112.

A multiplexing process performed by the centralization device 210 will now be described. The centralization device 210 generates second summing signals by multiplexing optical signals input from a dense wavelength division multiplexer 520 in units of dense wavelengths. The centralization device 210 generates second summing signals' (hereinafter, referred to as "coarse-multiplexed second summing signals") by multiplexing the second summing signals and optical signals in units of coarse wavelengths. The centralization device 210 distributes the coarse-multiplexed second summing signals to optical fibers. The dense wavelength refers to a wavelength having a narrow interval and the coarse wavelength refers to a wavelength having a wide interval. In a wavelength conversion process of the centralization device 210, the centralization device 210 generates wavelength-converted signals by wavelength-converting the first wireless optical signals or the first wired signals. The centralization device 210 receives the first wireless optical signals from the wireless donor unit group 110 and receives the first wired signals from the wired donor unit group 112. Next, the centralization device 210 generates third wireless optical signals by wavelength-converting of the first wireless optical signals and transmits the third wireless optical signals to a module for WDM. An operation of the centralization device 210 for generating a summing signal according to transmission rate will now be described. The centralization device 210 receives first wireless optical signals of a low transmission rate, and wavelength-converts and outputs the first wireless optical signals. The centralization device 210 generates the first wireless summing signal by summing the first wireless optical signals and wavelength-converts the first wireless summing signal. The centralization device 210 outputs the first wireless summing signal at a high transmission rate. Meanwhile, the centralization device 210 receives the first wired signals of a low transmission rate and wavelength-converts the first wired signals. The centralization device 210 generates the first wired summing signal by summing the first wired signals, wavelength-converts the first wired summing signal, and outputs the first wired summing signal at a high transmission rate.

Meanwhile, the centralization device 210 may be implemented by a device for performing wavelength conversion only. Then, the centralization device 210 generates wavelength-converted signals by wavelength-converting the multi-channel optical signals received from the wireless donor unit group 110 or the wired signals received from the wired donor unit group 112. The centralization device 210 multiplexes the wavelength-converted signals in units of wavelengths. The centralization device 210 distributes the wavelength-converted signals to the distribution device 220 connected thereto by optical fibers so that the distribution device 220 may perform signal processing using the wavelength-converted signals. The centralization device 210 may also be implemented by a device using a summing signal. Then, the centralization device 210 determines transmission rates of the multi-channel optical signals received from the wireless donor unit group 110 or the wired signals received from the wired donor unit group 112. The centralization device 210 generates a summing signal by summing the optical signals or the wired signals based on the determined transmission rates, and separates or multiplexes the summing signal in units of wavelengths. The centralization device 210 controls to distribute the summing signal to the distribution device 220 connected thereto by optical fibers so that the distribution device 220 may perform signal processing using the summing signal.

The distribution device 220 generates optical signals or wired signals by demultiplexing summing signals or wavelength-converted signals distributed by the centralized device 210 in units of wavelengths. The distribution device 220 transmits the optical signals or wired signals to the wireless remote unit group 130 or the wired remote unit group 132 via respective preset optical fibers. The distribution device 220 is interpreted as a group of multiple devices including a first distribution device 222, a second distribution device 224 and an N-th distribution device 226. Since the first distribution device 222, the second distribution device 224 and the N-th distribution device 226 are all the same in concept, the distribution device 220 will be described below as it encompasses all of the first distribution device 222, the second distribution device 224 and the N-th distribution device 226.

The distribution device 220 according to at least one embodiment of the present disclosure demultiplexes, in units of wavelengths, either the summing signals or the wavelength-converted signals input from the centralization device 210 connected thereto by optical fibers. The distribution device 220 transmits optical signals or wired signals obtained by decomposing the summing signals to the wireless remote unit group 130 or the wired remote unit group 132 or transmits optical signals obtained by wavelength-converting the wavelength-converted signals to the wireless remote unit group 130 or the wired remote unit group 132. In the demultiplexing operation of the distribution device 220 for demultiplexing either the summing signals or wavelength-converted signals in units of wavelengths, the distribution device 220 performs a switching operation to receive either the summing signals or the wavelength-converted signals from N shared optical fibers by using an optical switch.

The distribution device 220 transmits second wireless optical signals generated by decomposing coarse-multiplexed second summing signals which are the summing signals received from the centralization device 210, to the wireless remote unit group 130. Meanwhile, the distribution device 220 transmits second wired signals generated by decomposing the coarse-multiplexed second summing signals to the wired remote unit group 132. In the demultiplexing process of the distribution device 220, the distribution device 220 generates third summing signals by demultiplexing, in units of wavelengths, coarse components of the coarse-multiplexed second summing signals distributed through shared optical fibers and generates a fourth wireless summing signal by demultiplexing dense components of the third summing signals in units of wavelengths.

A wavelength conversion process of the distribution device 220 will now be described. The distribution device 220 wavelength-converts the received wavelength-converted signals and generates second wireless optical signals or second wired signals. The distribution device 220 receives fourth wireless optical signals from a module of wavelength division multiplexer and generates second wireless optical signals by wavelength converting the fourth wireless optical signals. Meanwhile, the distribution device 220 receives fourth wired optical signals from the wavelength division multiplexer, generates second wired signal by wavelength-converting the fourth wired optical signals, and transmits second wired signal to the wired remote unit group 132.

Hereinafter, a summing signal decomposing operation of the distribution device 220 according to transmission rate will be described. The distribution device 220 receives the fourth wireless summing signal of a high transmission rate and wavelength-converts the fourth wireless summing signal. The distribution device 220 generates second wireless optical signals by decomposing the fourth wireless summing signal and generates the second wireless optical signals at a low transmission rate by wavelength-converting the second wireless optical signals. Meanwhile, the distribution device 220 receives a fourth wired summing signal of a high transmission rate. The distribution device 220 wavelength-converts and generates the fourth wired summing signal, generates fourth wired signals' by decomposing the fourth wired summing signal, wavelength-converts the fourth wired signals', and wavelength-converts and generates the fourth wired signals' in a low transmission rate.

Meanwhile, when the distribution device 220 according to at least one embodiment of the present disclosure is implemented by a device for performing wavelength conversion only, the distribution device 220 demultiplexes, in units of wavelengths, wavelength-converted signals input from the centralization device 210 connected thereto by shared optical fibers. The distribution device 220 transmits, to the remote unit group, optical signals after wavelength-converting the wavelength-converted signals. When the distribution device 220 is implemented by a device for simply using summing signals, the distribution device 220 receives summing signals from the centralization device 210 connected thereto by shared optical fibers and demultiplexes the summing signals in units of wavelengths. The distribution device 220 decomposes the summing signals into optical signals and transmits the decomposed optical signals to the wireless remote unit group 130 or the wired remote unit group 132 via preset optical fibers according to transmission rate.

Figure 3:
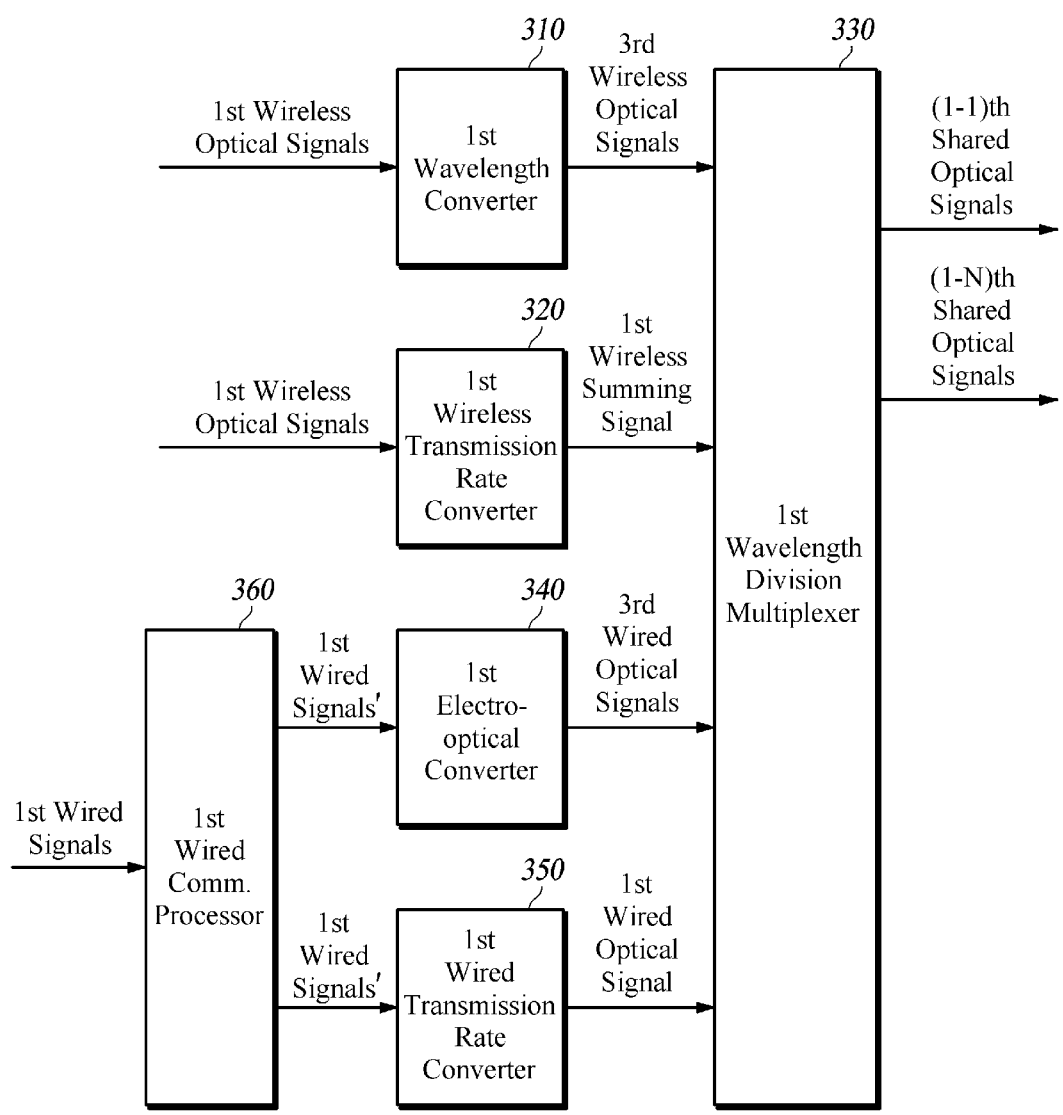
FIG. 3 is a schematic block diagram of a centralization device according to at least one embodiment of the present disclosure.

FIG. 3 is a schematic block diagram of a centralization device according to at least one embodiment of the present disclosure.

The centralization device 210 according to at least one embodiment of the present disclosure includes a first wavelength converter 310, a first wireless transmission rate converter 320, a first wavelength division multiplexer 330, a first electro-optical converter 340, a first wired transmission rate converter 350 and a first wired communication processor 360. Although the centralization device 210 according to at least one embodiment of the present disclosure has been described as including only the first wavelength converter 310, the first wireless transmission rate converter 320, the first wavelength division multiplexer 330, the first electro-optical converter 340, the first wired transmission rate converter 350 and the first wired communication processor 360, this is merely for exemplary description of the technical idea of at least one embodiment of the present disclosure. Therefore, those skilled in the art will appreciate that various modifications, additions, and substitutions of the components included in the centralization device 210 are possible, without departing from the characteristics of at least one embodiment of the present disclosure.

When the centralization device 210 according to at least one embodiment of the present disclosure is implemented by a device for performing wavelength conversion only, the centralization device 210 may include only the first wavelength converter 310 and the first wavelength division multiplexer 330. When the centralization device 210 is implemented by a device for generating summing signals, the centralization device 210 may include only the first wireless transmission rate converter 320 and the first wavelength division multiplexer 330. When the centralization device 210 is realized by a device for both generating the summing signals and performing wavelength conversion, the centralization device 210 may include the first wavelength converter 310, the first wireless transmission rate converter 320 and the first wavelength division multiplexer 330.

The first wavelength converter 310 generates wavelength-converted signals by wavelength-converting multi-channel optical signals input from the wireless donor unit group 110. The first wavelength converter 310 receives first wireless optical signals, which are the multi-channel optical signals input from the wireless donor unit group 110, and generates third wireless optical signals, which are the wavelength-converted signals generated by wavelength converting the first wireless optical signals. The first wavelength converter 310 transmits the third wireless optical signals to the first wavelength division multiplexer 330.

The first wireless transmission rate converter 320 determines transmission rates of the multi-channel optical signals input from the wireless donor unit group 110 and generates a summing signal by summing the optical signals based on the determined transmission rates. A signal processing process of the first wireless transmission rate converter 320 will now be described in more detail. The first wireless transmission rate converter 320 generates a first wireless summing signal by summing the first wireless optical signals which are the optical signals input from wireless donor unit group 110. The first wireless transmission rate converter 320 receives the first wireless optical signals of a low transmission rate and wavelength-converts and outputs the first wireless optical signals. The first wireless transmission rate converter 320 generates the first wireless summing signal by summing the first wireless optical signals, wavelength-converts the first wireless summing signal, and generates the first wireless summing signal of a high transmission rate.

The first wavelength division multiplexer 330 performs multiplexing for using a plurality of communication channels through one optical fiber. WDM is a scheme in which a transmitter transmits signals having different wavelengths by using a single optical fiber and a receiver separates the transmitted signals into signals according to respective wavelengths.

A process by the first wavelength division multiplexer 330 according to at least one embodiment performed on the wavelength-converted signals and the summing signals will now be described. The first wavelength division multiplexer 330 multiplexes, in units of wavelengths, the summing signal received from the first wireless transmission rate converter 320 and the wavelength-converted signals received from the first wavelength converter 310. The first wavelength division multiplexer 330 distributes the summing signal and wavelength-converted signals to the distribution device 220 connected thereto by shared optical fibers. Processing the wavelength-converted signals by the first wavelength division multiplexer 330 will now be described. The first wavelength division multiplexer 330 multiplexes the wavelength-converted signals received from the first wavelength converter 310 in units of wavelengths. The first wavelength division multiplexer 330 controls to distribute the wavelength-converted signals to the distribution device 220 connected thereto by shared optical fibers. Processing the summing signal by the first wavelength division multiplexer 330 will now be described. The first wavelength division multiplexer 330 separates or multiplexes the summing signal received from the first wireless transmission rate converter 320 in units of wavelengths. The first wavelength division multiplexer 330 controls to distribute the summing signal to the distribution device 220 connected thereto by shared optical fibers so that the distribution device 220 performs signal processing using the summing signal.

The first electro-optical converter 340 generates wavelength-converted signals by wavelength-converting wired signals input from the wired donor unit group 112. The first electro-optical converter 340 receives first wired signals which are the wired signals input from the wired donor unit group 112, and generates third wired optical signals which are the wavelength-converted signals obtained by wavelength-converting the first wired signals. The first electro-optical converter 340 transmits the third wired optical signals to the first wavelength division multiplexer 330. In other words, the first electro-optical converter 340 wavelength-converts first wired signals' received from the first wired communication processor 360 into third wired optical signals.

The first wired transmission rate converter 350 determines transmission rates of wired signals input from the first wired communication processor 360 and generates a summing signal by summing optical signals based on the transmission rates. A process for performing signal processing by the first wired transmission rate converter 350 will now be described in more detail. The first wired transmission rate converter 350 generates a first wired summing signal by summing the first wired signals' which are obtained by standard processing, by the first wired communication processor 360, the first wired signals input from the wired donor group 112. The first wired transmission rate converter 350 receives the first wired signals' of a low transmission rate and wavelength-converts and outputs the first wired signals'. The first wired transmission rate converter 350 generates the first wired summing signal by summing the first wired signals', wavelength-converts the first wired summing signal, and generates the first wired summing signal at a high transmission rate. The first wired communication processor 360 generates the first wired signals' by standard processing the first wired signals received from a plurality of devices included in the wired donor unit group 112. The first wired communication processor 360 transmits the generated first wired signals' to the first electro-optical converter 340 and first wired transmission rate converter 350.

Figure 4:
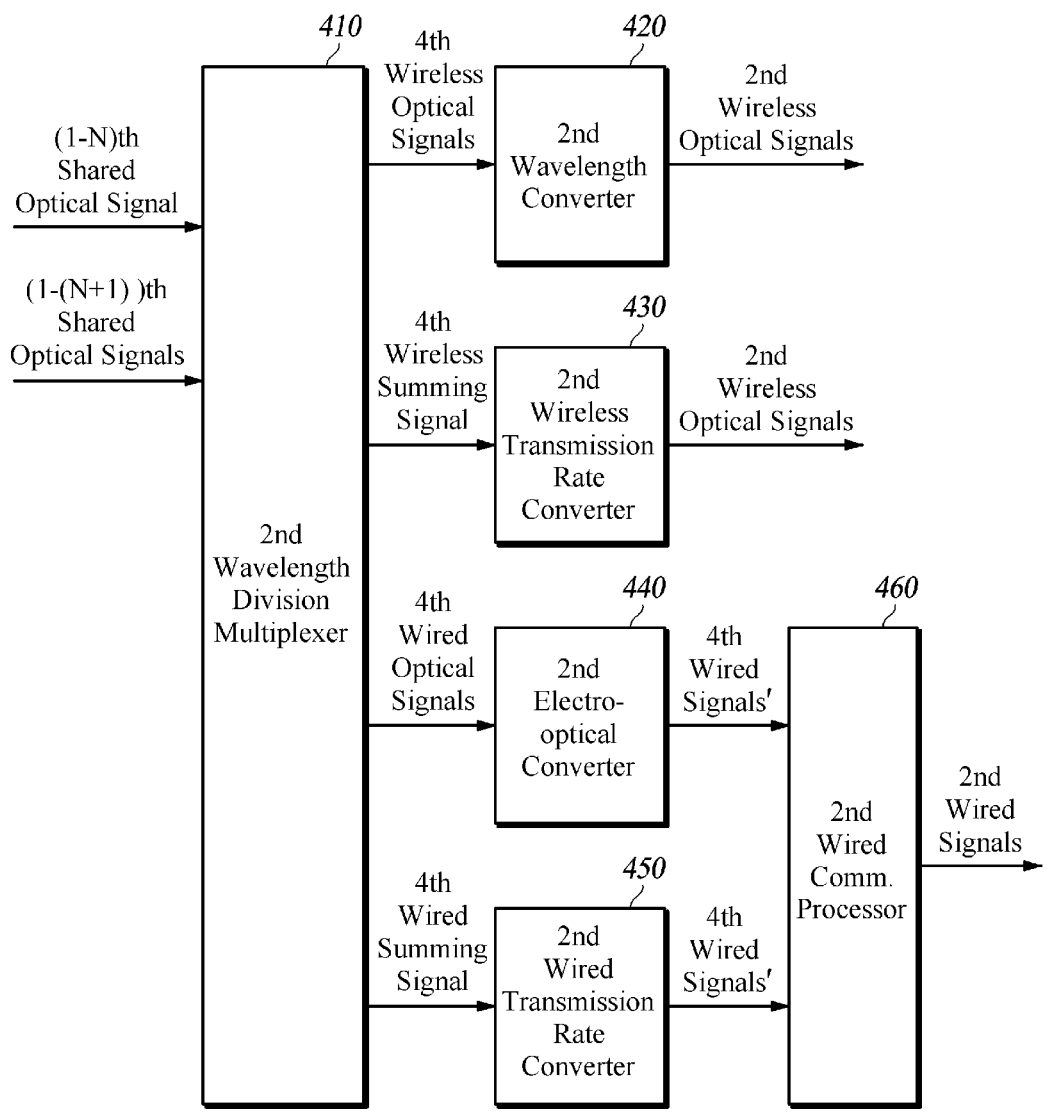
FIG. 4 is a schematic block diagram of a distribution device according to at least one embodiment of the present disclosure.

FIG. 4 is a block diagram of a distribution device according to at least one embodiment of the present disclosure.

The distribution device 220 according to at least one embodiment of the present disclosure includes a second wavelength division multiplexer 410, a second wavelength converter 420, a second wireless transmission rate converter 430, a second electro-optical converter 440, a second wired transmission rate converter 450 and a second wired communication processor 460. Although the distribution device 220 according to at least one embodiment of the present disclosure has been described as including only the second wavelength division multiplexer 410, second wavelength converter 420, second wireless transmission rate converter 430, second electro-optical converter 440, second wired transmission rate converter 450 and second wired communication processor 460, this is merely for exemplary description of the technical spirit of at least one embodiment of the present disclosure. Therefore, those skilled in the art will appreciate that various modifications, additions, and substitutions of the components included in the distribution device 220 are possible, without departing from the characteristics of at least one embodiment of the present disclosure.

When the distribution device 220 according to at least one embodiment of the present disclosure is implemented by a device for performing wavelength conversion only, the distribution device 220 may include only the second wavelength converter 420 and the second wavelength division multiplexer 410. When the distribution device 220 is implemented by a device for generating summing signals, the distribution device 220 may include only the second wireless transmission rate converter 430 and the second wavelength division multiplexer 410. When the distribution device 220 is implemented by a device for both generating the summing signals and performing wavelength conversion, the distribution device 220 may be configured to include the second wireless transmission rate converter 430, the second wavelength converter 420 and the second wavelength division multiplexer 410.

The second wavelength division multiplexer 410 receives summing signals from the centralization device 210 connected thereto by shared optical fibers and demultiplexes the summing signals in units of wavelengths. The second wavelength division multiplexer 410 also demultiplexes wavelength-converted signals input from the centralization device 210 connected thereto by shared optical fibers, in units of wavelengths. Meanwhile, the second wavelength division multiplexer 410 may receive both the summing signals and the wavelength-converted signals input from the centralization device 120 connected thereto by shared optical fibers. The second wavelength division multiplexer 410 demultiplexes, in units of wavelengths, the summing signals and wavelength-converted signals input from the centralization device 210 connected thereto by shared optical fibers. Here, the second wavelength division multiplexer 410 performs a switching operation to receive the summing signals and the wavelength-converted signals from N shared optical fibers by using an optical switch.

The second wavelength division multiplexer 410 includes a second coarse wavelength division multiplexer 610 and a second dense wavelength division multiplexer 620. The second coarse wavelength division multiplexer 610 generates third summing signals by demultiplexing, in units of wavelengths, coarse components of coarse-multiplexed second summing signals distributed from shared optical fibers. The second dense wavelength division multiplexer 620 generates a fourth wireless summing signal by demultiplexing dense components of the third summing signals in units of wavelengths.

The second wavelength converter 420 generates second wireless optical signals by performing a wavelength conversion on wavelength-converted signals received from the second wavelength division multiplexer 410. The second wavelength converter 420 receives the wavelength-converted signals as fourth wireless optical signals from the second wavelength division multiplexer 410. The second wavelength converter 420 generates the second wireless optical signals by wavelength-converting the fourth wireless optical signals and transmits the second wireless optical signals to the wireless remote unit group 130. The second wavelength converter 420 transmits optical signals generated by performing a wavelength conversion on the wavelength-converted signals to the wireless remote unit group 130.

The second wireless transmission rate converter 430 decomposes a summing signal received from the second wavelength division multiplexer 410 into optical signals. The second wireless transmission rate converter 430 transmits the decomposed optical signals to the wireless remote unit group 130 via preset optical fibers according to transmission rate. The second wireless transmission rate converter 430 transmits optical signals generated by decomposing the coarse-multiplexed second summing signals received from the centralization device 210, as second wireless optical signals to the wireless remote unit group 130. The second wireless transmission rate converter 430 receives fourth wireless summing signal of a high transmission rate from the second wavelength division multiplexer 410. The second wireless transmission rate converter 430 wavelength-converts and outputs the fourth wireless summing signal. The second wireless transmission rate converter 430 generates second wireless optical signals by decomposing the fourth wireless summing signal and wavelength-converts and outputs the second wireless optical signals in a low transmission rate.

The second electro-optical converter 440 performs a wavelength-conversion on wavelength-converted signals received from the second wavelength division multiplexer 410 to have the second wired communication processor 460 generate the twice wavelength-converted signals as second wired signals. The second electro-optical converter 440 receives the wavelength-converted signals as fourth wireless optical signals from the second wavelength division multiplexer 410. The second electro-optical converter 440 generates fourth wired signals' by wavelength-converting the fourth wired optical signals. The second electro-optical converter 440 transmits the fourth wired signals' to the second wired communication processor 460. Here, the second electro-optical converter 440 transmits wired signals generated by performing another wavelength-conversion on the wavelength-converted signals to the second wired communication processor 460.

The second wired transmission rate converter 450 decomposes a summing signal received from the second wavelength division multiplexer 410 into wired signals. The second wired transmission rate converter 450 transmits the decomposed wired signals to the second wired communication processor 460 via preset optical fibers according to transmission rate. The second wired transmission rate converter 450 transmits wired signals generated by decomposing the coarse-multiplexed second summing signals received from the centralization device 210, fourth wired signals' to the second wired communication processor 460. The second wired transmission rate converter 450 receives fourth wired summing signal of a high transmission rate from the second wavelength division multiplexer 410. The second wired transmission rate converter 450 wavelength-converts and outputs the fourth wired summing signal and generates fourth wired signals' by decomposing the fourth wired summing signal. The second wired transmission rate converter 450 wavelength-converts and outputs the fourth wired signals' in a low transmission rate. The second wired communication processor 460 converts the fourth wired signal' received from the second electro-optical converter 440 and the second wired transmission rate converter 450 into the second wired signals applicable to the wired remote unit group 132.

Figure 5:
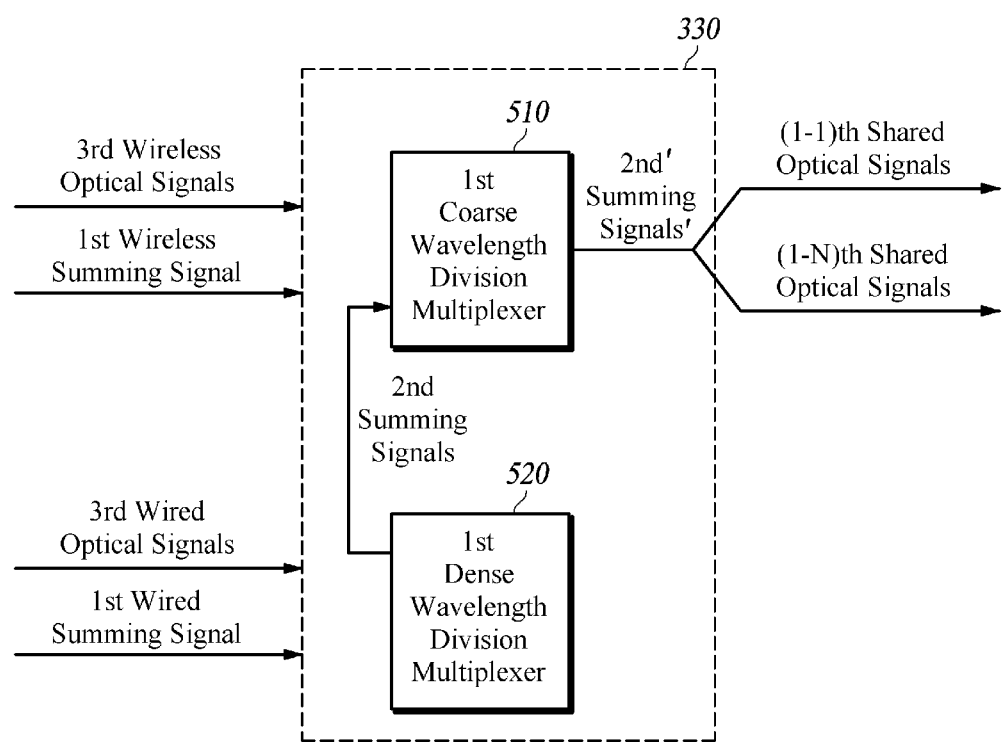
FIG. 5 is a block diagram of a first wavelength division multiplexer according to at least one embodiment of the present disclosure.

FIG. 5 is a block diagram of a first wavelength division multiplexer according to at least one embodiment of the present disclosure.

The first wavelength division multiplexer 330 performs multiplexing of using a plurality of communication channels through one optical fiber. WDM is a scheme in which a transmitter transmits signals having different wavelengths through one optical fiber and a receiver separates the transmitted signals into signals according to respective wavelengths. The first wavelength division multiplexer 330 includes a first coarse wavelength division multiplexer 510 and a first dense wavelength division multiplexer 520.

A processing, by the first wavelength division multiplexer 330 according to at least one embodiment of the present disclosure, of wavelength-converted signals and summing signals will now be described. The first wavelength division multiplexer 330 multiplexes, in units of wavelengths, summing signals received from the first wireless transmission rate converter 320 and wavelength-converted signals received from the first wavelength converter 310. The first wavelength division multiplexer 330 distributes the summing signals and the wavelength-converted signals to the distribution device 220 connected thereto by shared optical fibers. A processing of the wavelength-converted signals by the first wavelength division multiplexer 330 will now be described. The first wavelength division multiplexer 330 multiplexes the wavelength-converted signals received from the first wavelength converter 310 in units of wavelengths and controls to distribute the wavelength-converted signals to the distribution device 220 connected thereto by shared optical fibers. A processing of the summing signals by the first wavelength division multiplexer 330 will now be described. The first wavelength division multiplexer 330 separates or multiplexes the summing signals received from the first wireless transmission rate converter 320 in units of wavelengths. The first wavelength division multiplexer 330 distributes the summing signals to the distribution device 220 connected thereto by shared optical fibers so that the distribution device 220 performs signal processing using the summing signals.

In order for the first dense wavelength division multiplexer 520 to perform optical communication during large-capacity WDM through various networks, the optical communication of WDM needs to be in the form of the large number of channels and a very narrow channel interval of 10 GHz or less. A module for performing dense WDM (DWDM) or optical frequency division multiplexing (OFDM) may be the first dense wavelength division multiplexer 520. In other words, steady optical frequency intervals are maintained between different light sources of an optical communication system by using a control signal provided by a beat frequency component of the same size as the frequency difference between channels generated when the centralization device 210 simultaneously detects lights of different wavelengths. When a transmission rate is sufficiently lower than the beat frequency, the interval between optical channels can be minimized to 10 GHz or less. Accordingly, a light source for a WDM system having a very narrow channel interval can be easily configured. In case of bi-directional optical communication, this can reduce a crosstalk phenomenon between transmission and reception channels generated by Rayleigh scattering due to possible slight difference between the channel at transmission and the channel at reception.

The first dense wavelength division multiplexer 520 according to at least one embodiment of the present disclosure generates second summing signals by multiplexing a first wireless summing signal and a first wired summing signal in units of wavelengths of a dense optical signal. The dense optical signal refers to an optical signal having a narrow wavelength. In other words, the first dense wavelength division multiplexer 520 generates the second summing signals by multiplexing the first wireless summing signal and the first wired summing signal in units of wavelengths of a dense optical signal having a narrow wavelength interval.

Due to a wide wavelength interval, the first coarse wavelength division multiplexer 510 may use an uncooled distributed feedback (DFB) laser and a wideband optical filter and may be implemented to have lower power consumption and small size. In addition, the first coarse wavelength division multiplexer 510 multiplexes and transmits a plurality of optical signals by a WDM scheme through one optical cable. For example, the first coarse wavelength division multiplexer 510 may use a full wavelength interval (e.g. 16 channels among 18 channels ranging from 1270 nm to 1610 nm) of an optical fiber by a CWDM scheme. The first coarse wavelength division multiplexer 510 includes a multiplexer (MUX)/demultiplexer (DeMUX) and an optical cable for connecting the MUX/DeMUX. When optical signals are to be transmitted or received between the MUX and the DeMUX, an optical add/drop multiplexer (OADM) may be installed.

The first coarse wavelength division multiplexer 510 according to at least one embodiment of the present disclosure generates second summing signals' by multiplexing, in units of wavelengths, coarse components of the second summing signals received from the first dense wavelength division multiplexer 520. The first coarse wavelength division multiplexer 510 distributes the coarse-multiplexed second summing signals through shared optical fibers. In other words, the first coarse wavelength division multiplexer 510 distributes the coarse-multiplexed second summing signals to the distribution device 220 connected through a (1-1)th shared optical fiber and a (1-N)th shared optical fiber. The coarse optical signals refer to optical signals having a wide wavelength interval. In other words, the first coarse wavelength division multiplexer 510 generates the coarse-multiplexed second summing signals by multiplexing the coarse components of the second summing signals in units of wavelengths and distributes the coarse-multiplexed second summing signals through the shared optical fibers.

Figure 6:
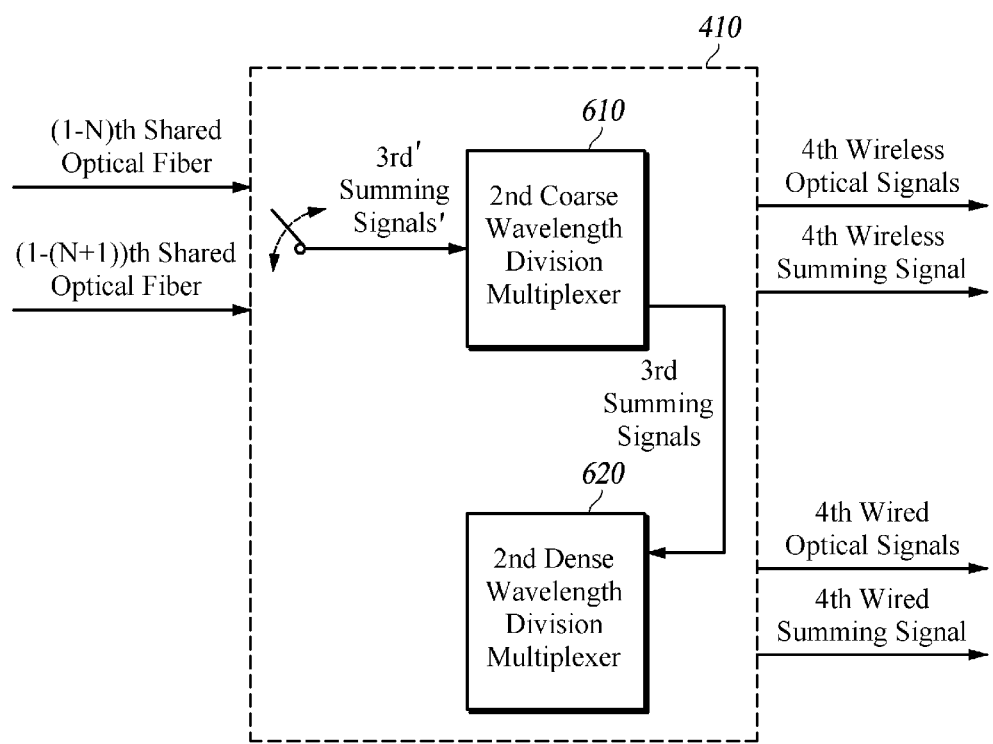
FIG. 6 is a block diagram of a second wavelength division multiplexer according to at least one embodiment of the present disclosure.

FIG. 6 is a block diagram of a second wavelength division multiplexer according to at least one embodiment of the present disclosure.

The second wavelength division multiplexer 410 includes a second coarse wavelength division multiplexer 610 and a second dense wavelength division multiplexer 620. The second coarse wavelength division multiplexer 610 demultiplexes, in units of coarse wavelengths, third summing signals' selected by an optical switch among coarse-multiplexed second summing signals distributed through shared optical fibers and generates third summing signals to be transmitted to the second dense wavelength division multiplexer 620. The second dense wavelength division multiplexer 620 generates fourth wireless optical signals, fourth wired optical signals, a fourth wireless summing signal and a fourth wired summing signal by demultiplexing dense components of the third summing signals in units of wavelengths.

Figure 7:
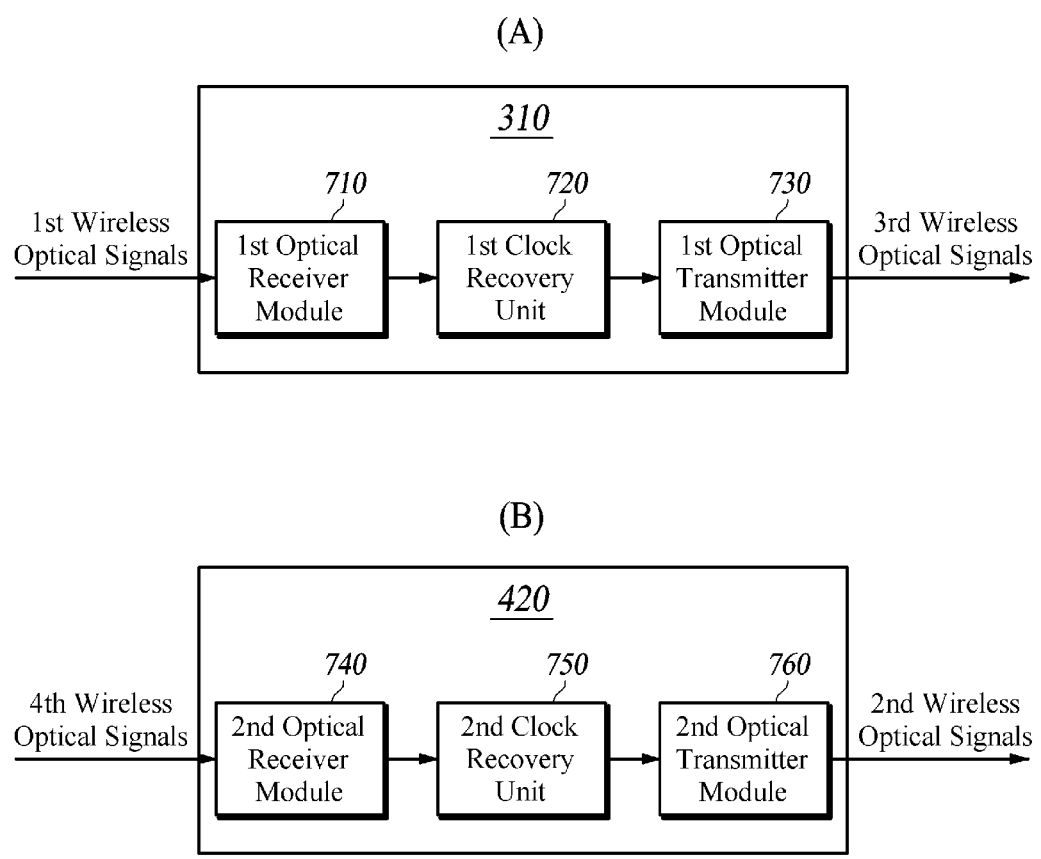
FIG. 7 is a schematic block diagram of a wavelength converter according to at least one embodiment of the present disclosure.

FIG. 7 is block diagram of a wavelength converter according to at least one embodiment of the present disclosure.

By schematic diagram (A), FIG. 7 shows the first wavelength converter 310 of the centralization device 210, which includes a first optical receiver module 710, a first clock recovery unit 720 and a first optical transmitter module 730. Obviously, this is merely for exemplary description of the technical idea of at least one embodiment of the present disclosure. Therefore, those skilled in the art will appreciate that various modifications, additions and substitutions of the components included in the first wavelength converter 310 are possible, without departing from the characteristics of at least one embodiment of the present disclosure. The first optical receiver module 710 receives first wireless optical signals from the wireless donor unit group 110. The first clock recovery unit 720 generates third wireless optical signals by wavelength-converting the first wireless optical signals received from the first optical receiver module 710. The first optical transmitter module 730 transmits the third wireless optical signals received from the first clock recovery unit 720 to the first wavelength division multiplexer 330.

By schematic diagram (B), FIG. 7 shows the second wavelength converter 420 of the distribution device 220, which includes a second optical receiver module 740, a second clock recovery unit 750 and a second optical transmitter module 760. Obviously, this is merely for exemplary description of the technical idea of at least one embodiment of the present disclosure. Therefore, those skilled in the art will appreciate that various modifications, additions, and substitutions of the components included in the second wavelength converter 420 are possible, without departing from the characteristics of at least one embodiment of the present disclosure. The second optical receiver module 740 receives fourth wireless optical signals from the second wavelength division multiplexer. The second clock recovery unit 750 wavelength-converts the fourth wireless optical signals received from the second optical receiver module 740 and generates second wireless optical signals. The second optical transmitter module 760 transmits the second wireless optical signals received from the second clock recovery unit 750 to the wireless remote unit group 130.

Figure 8:
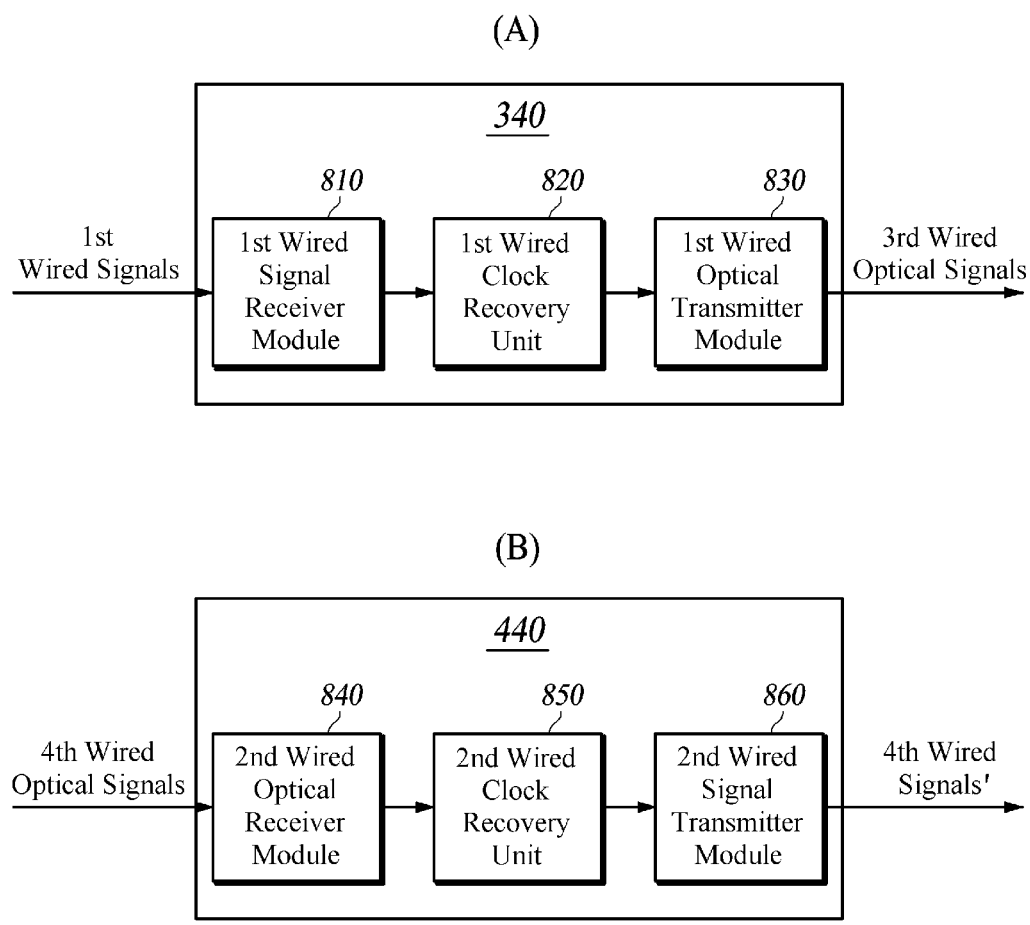
FIG. 8 is a schematic block diagram of an electro-optical converter according to at least one embodiment of the present disclosure.

FIG. 8 is a schematic block diagram of an electro-optical converter according to at least one embodiment of the present disclosure.

By schematic block diagram (A), FIG. 8 shows the first electro-optical converter 340 of the centralization device 210, which includes a first wired signal receiver module 810, a first wired clock recovery unit 820 and a first wired optical transmitter module 830. Obviously, this is merely for exemplary description of the technical idea of at least one embodiment of the present disclosure. Therefore, those skilled in the art will appreciate that various modifications, additions and substitutions of the components included in the first electro-optical converter 340 are possible, without departing from the characteristics of at least one embodiment of the present disclosure. The first wired signal receiver module 810 receives first wired signals from the wired donor unit group 112. The first wired clock recovery unit 820 generates third wired optical signals by wavelength-converting the first wired signals received from the first wired signal receiver module 810. The first wired optical transmitter module 830 transmits the third wired optical signals received from the first wired clock recovery unit 820 to the first wavelength division multiplexer 330.

By schematic block diagram (B), FIG. 8 shows the second electro-optical converter 440 of the distribution device 220, which includes a second wired optical receiver module 840, a second wired clock recovery unit 850, and a second wired signal transmitter module 860. Obviously, this is merely for exemplary description of the technical idea of at least one embodiment of the present disclosure. Therefore, those skilled in the art will appreciate that various modifications, additions and substitutions of the components included in the second electro-optical converter 440 are possible, without departing from the characteristics of at least one embodiment of the present disclosure. The second wired optical receiver module 840 receives fourth wired optical signals from the second wavelength division multiplexer 410. The second wired clock recovery unit 850 performs a wavelength-conversion on the fourth wired optical signals' received from the second wired optical receiver module 840 to eventually generate second wired signals. The second wired signal transmitter module 860 transmits the second wired signals received from the second wired clock recovery unit 850 to the wired remote unit group 132.

Figure 9:
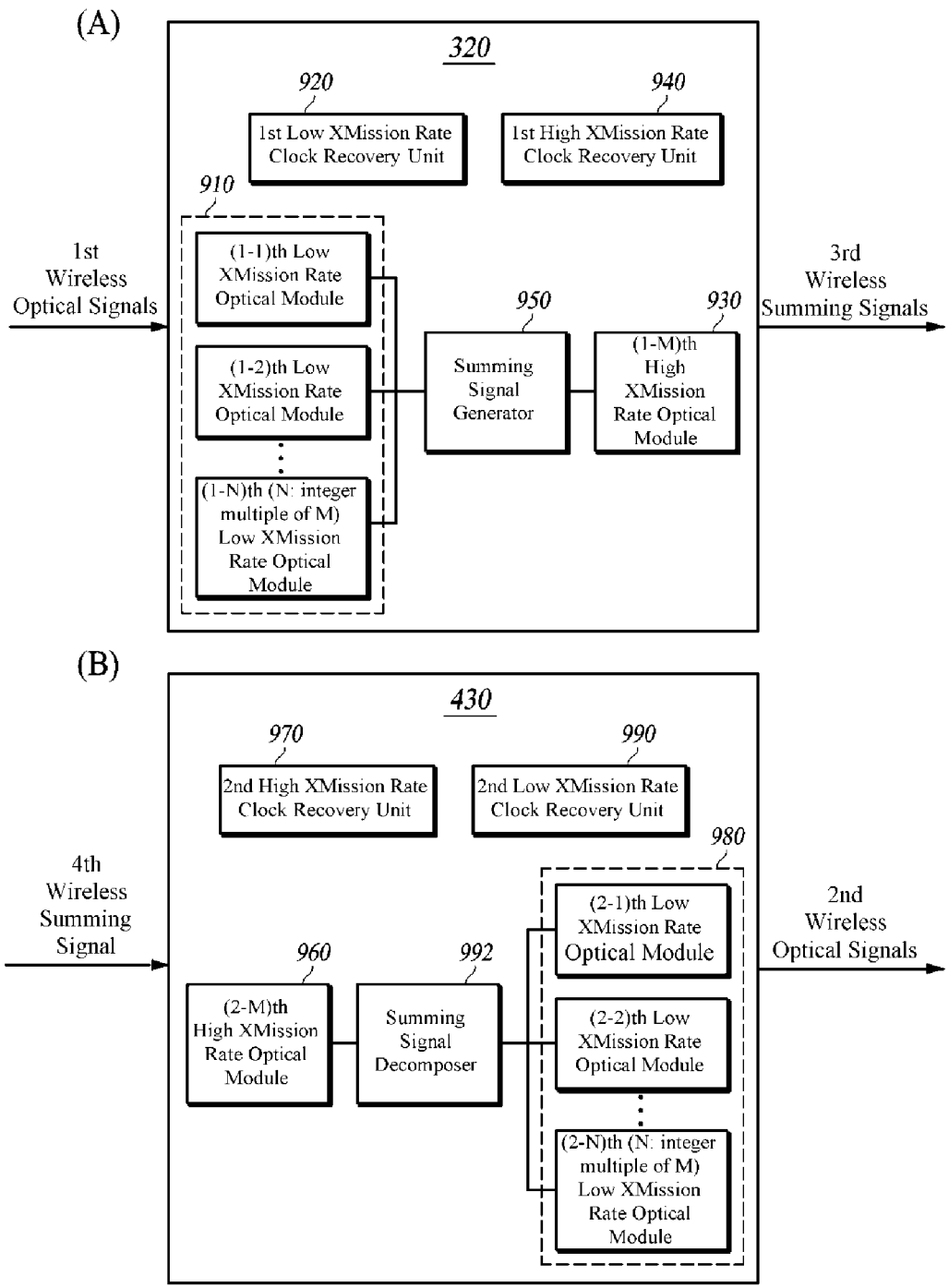
FIG. 9 is a schematic block diagram of a wireless transmission rate converter according to at least one embodiment of the present disclosure.

FIG. 9 is a block diagram of a wireless transmission rate converter according to at least one embodiment of the present disclosure.

By schematic block diagram (A), FIG. 9 shows the first wireless transmission rate converter 320 of the centralization device 210, which includes a first low transmission rate optical module 910, a first low transmission rate clock recovery unit 920, a first high transmission rate optical module 930, a first high transmission rate clock recovery unit 940 and a summing signal generator 950. Obviously, this is merely for exemplary description of the technical idea of at least one embodiment of the present disclosure. Therefore, those skilled in the art will appreciate that various modifications, additions and substitutions of the components included in the first wireless transmission rate converter 320 are possible, without departing from the characteristics of at least one embodiment of the present disclosure. The first low transmission rate optical module 910 receives first wireless optical signals of a low transmission rate from the wireless donor unit group 110. The first low transmission rate clock recovery unit 920 wavelength-converts the first wireless optical signals. The summing signal generator 950 generates a first wireless summing signal by summing the first wireless optical signals. The first high transmission rate clock recovery unit 940 wavelength-converts the first wireless summing signal, and the first high transmission rate optical module 930 generates the first wireless summing signal at a high transmission rate. When the number of first high transmission rate optical modules 930 is M, the number of first low transmission rate optical modules 910 may be N which an integer multiple of M.

By schematic block diagram (B), FIG. 9 shows the second wireless transmission rate converter 430 of the distribution device 220, which includes a second high transmission rate optical module 960, a second high transmission rate clock recovery unit 970, a second low transmission rate optical module 980, a second low transmission rate clock recovery unit 990 and a summing signal decomposer 992. Obviously, this is merely for exemplary description of the technical idea of at least one embodiment of the present disclosure. Therefore, those skilled in the art will appreciate that various modifications, additions and substitutions of the components included in the second wireless transmission rate converter 430 are possible, without departing from the characteristics of at least one embodiment of the present disclosure. The second low transmission rate optical module 980 receives a fourth wireless summing signal of a low transmission rate from the second wavelength division multiplexer 410. The second high transmission rate optical module 960 receives the fourth wireless summing signal of a high bit rate, and the second high transmission rate clock recovery unit 970 wavelength-converts the fourth wireless summing signal. The summing signal decomposer 992 generates second wireless optical signals by decomposing the fourth wireless summing signal. The second low transmission rate clock recovery unit 990 wavelength-converts the second wireless optical signals. The second high transmission rate optical module 960 generates the second wireless optical signals at a low transmission rate. When the number of second high transmission rate optical modules 960 is M, the number of second low transmission rate optical modules 980 may be N which is an integer multiple of N.

Figure 10:
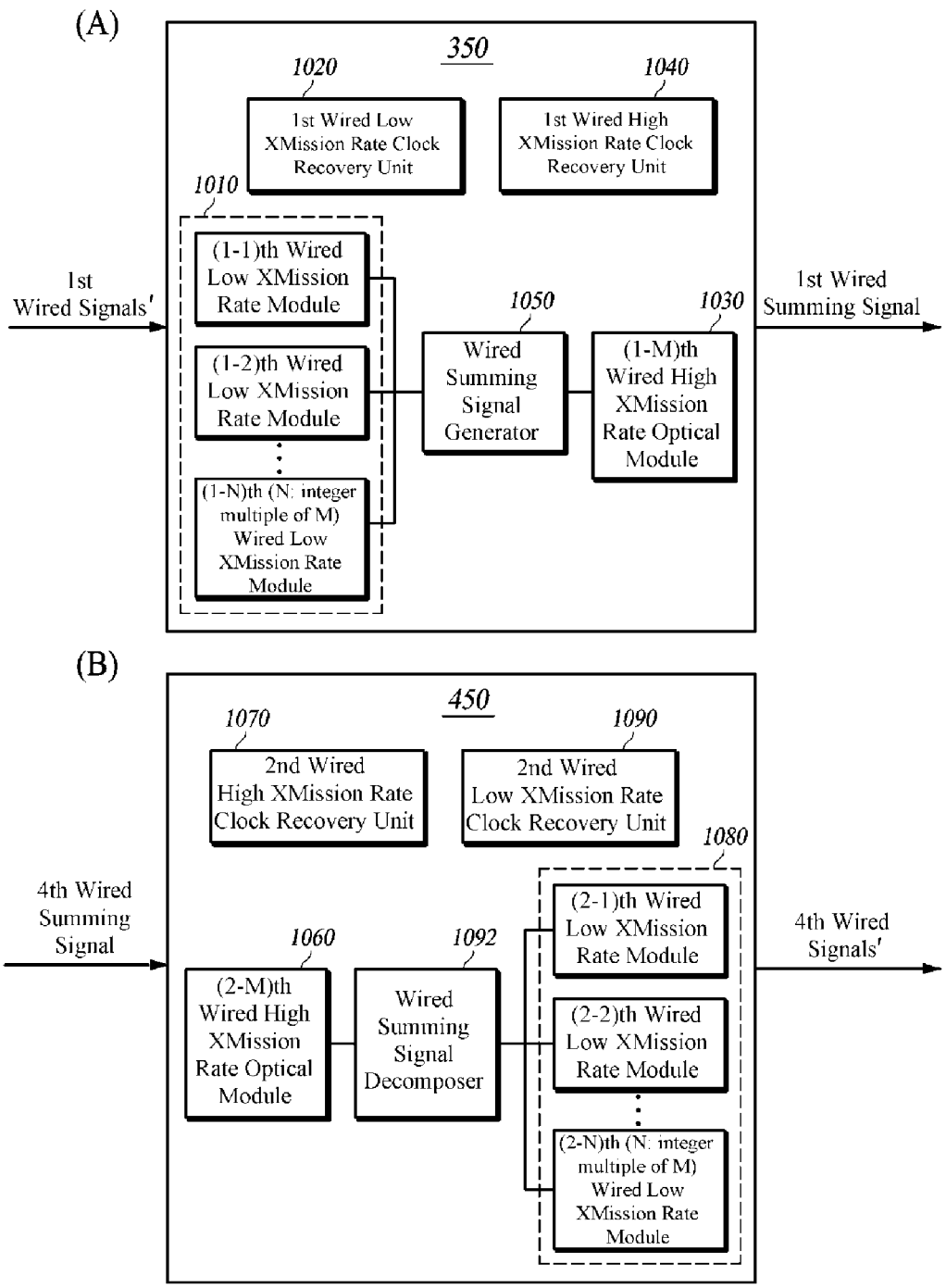
FIG. 10 is a schematic block diagram of a wired transmission rate converter according to at least one embodiment of the present disclosure.

FIG. 10 is a schematic block diagram of a wired transmission rate converter according to at least one embodiment of the present disclosure.

By schematic block diagram (A), FIG. 10 shows the first wired transmission rate converter 350 of the centralization device 210, which includes a first wired low transmission rate module 1010, a first wired low transmission rate clock recovery unit 1020, a first wired high transmission rate optical module 1030, a first wired high transmission rate clock recovery unit 1040 and a wired summing signal generator 1050. Obviously, this is merely for exemplary description of the technical spirit of at least one embodiment of the present disclosure. Therefore, those skilled in the art will appreciate that various modifications, additions, and substitutions of the components included in the first wired transmission rate converter 350 are possible, without departing from the characteristics of at least one embodiment of the present disclosure. The first wired low transmission rate module 1010 receives first wired signals' (first wired signals) at a low transmission rate from the wired donor unit group 112, and the first wired low transmission rate clock recovery unit 1020 wavelength-converts and outputs the first wired signals' (first wired signals). The wired summing signal generator 1050 generates a first wired summing signal by summing the first wired signals' (first wired signals). The first wired high transmission rate clock recovery unit 1040 wavelength-converts the first wired summing signal. The first wired high transmission rate optical module 1030 generates the first wired summing signal at a high transmission rate. When the number of first wired high transmission rate optical modules 1030 is M, the number of first wired low transmission rate modules 1010 is N which is an integer multiple of M.

By schematic block diagram (B), FIG. 10 shows the second wired transmission rate converter 450 of the distribution device 220, which includes a second wired high transmission rate optical module 1060, a second wired high transmission rate clock recovery unit 1070, a second wired low transmission rate wired module 1080, a second wired low transmission rate clock recovery unit 1090 and a wired summing signal decomposer 1092. Obviously, this is merely for exemplary description of the technical idea of at least one embodiment of the present disclosure. Therefore, those skilled in the art will appreciate that various modifications, additions and substitutions of the components included in the second wired transmission rate converter 450 are possible, without departing from the characteristics of at least one embodiment of the present disclosure. The second wired low transmission rate wired module 1080 receives a fourth wired summing signal of a low transmission rate from the second wavelength division multiplexer 410. The second wired high transmission rate optical module 1060 receives the fourth wired summing signal of a high transmission rate. The second wired high transmission rate clock recovery unit 1070 wavelength-converts and outputs the fourth wired summing signal. The wired summing signal decomposer 1092 generates fourth wired signals' by decomposing the fourth wired summing signal. The second wired low transmission rate clock recovery unit 1090 wavelength-converts the fourth wired signals'. The second wired high transmission rate optical module 1060 generates the fourth wired signal' at a low bit rate. When the number of second wired high transmission rate optical modules 1060 is M, the number of second wired low transmission rate wired modules 1080 may be N which is an integer multiple of M.

Figure 11:
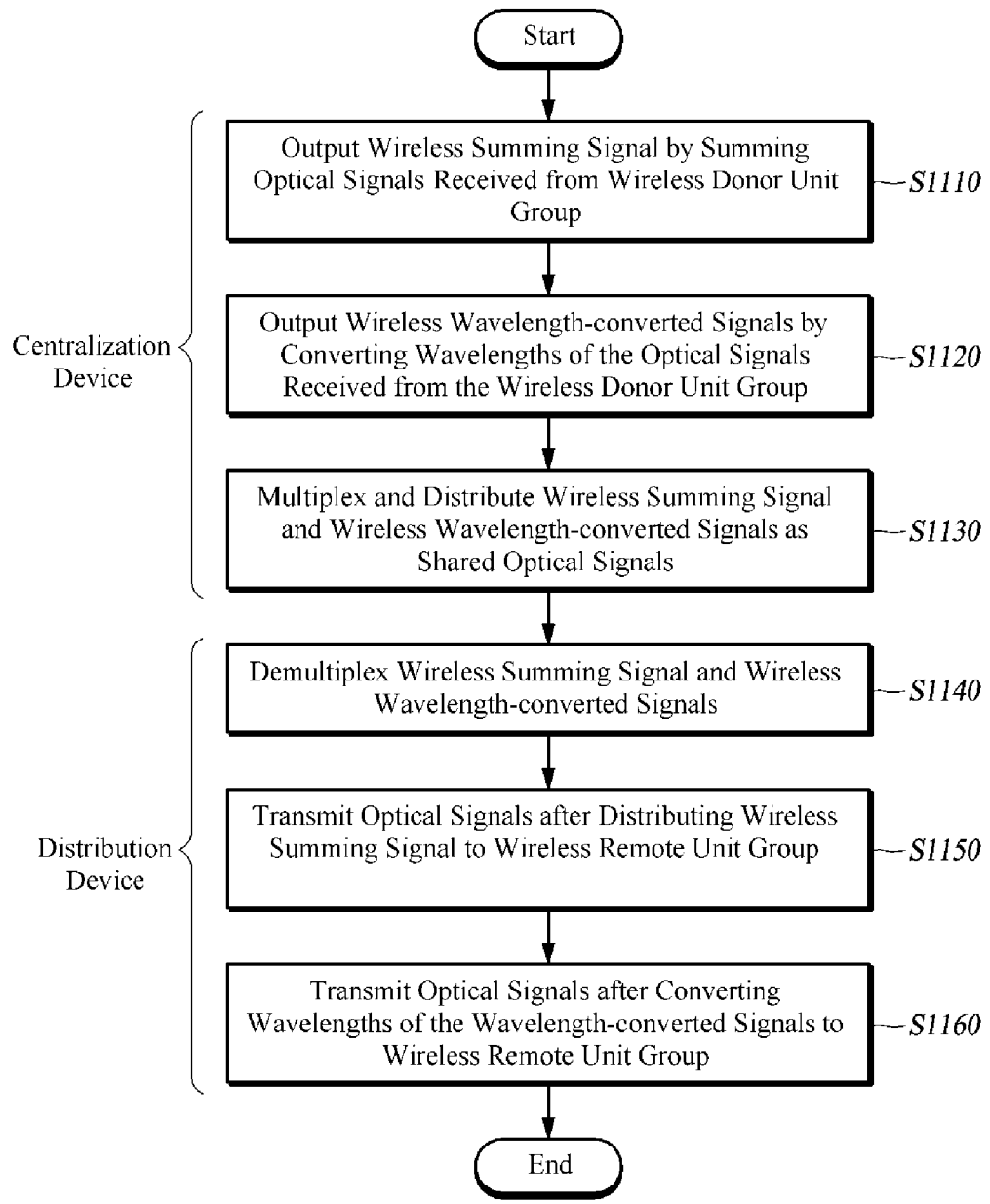
FIG. 11 is a flowchart of a wireless optical fiber sharing method according to at least one embodiment of the present disclosure.

FIG. 11 is a flowchart of a wireless optical fiber sharing method according to at least one embodiment of the present disclosure.

The centralization device 210 generates a summing signal by summing multi-channel optical signals input from the wireless donor unit group 110 at step S1110. At step S1110, the centralization device 210 generates a first wireless summing signal by summing first wireless optical signals received from the wireless donor unit group 110. At step S1110, the centralization device 210 receives the first wireless optical signals of a low transmission rate and wavelength-converts the first wireless optical signals. The centralization device 210 generates the first wireless summing signal by summing the first wireless optical signals and then wavelength-converts the first wireless summing signal. The centralization device 210 generates the first wireless summing signal at a high transmission rate.

The centralization device 210 generates wireless wavelength-converted signals by wavelength-converting the optical signals received from the wireless donor unit group 110 (S1120). At step S1120, the centralization device 210 generates the wireless wavelength-converted signals by wavelength-converting the first wireless optical signals. Here, the centralization device 210 receives the first wireless optical signals from the wireless donor unit group 110. The centralization device 210 generates third wireless optical signals by wavelength-converting the first wireless optical signals and transmits the third wireless optical signals to a module for performing WDM.

The centralization device 210 multiplexes the summing signal and the wireless wavelength-converted signals in units of wavelengths and distributes the summing signal and the wireless wavelength-converted signals to the distribution device 220 connected thereto by shared optical fibers (S1130). At step S1130, the centralization device 210 performs a switching operation so that the summing signal and wireless wavelength-converted signals are distributed to N shared optical fibers by using an optical switch included therein. At step S1130, the centralization device 210 generates second summing signals by multiplexing dense components of the first wireless summing signal in units of wavelengths. The centralization device 210 generates coarse-multiplexed second summing signals by multiplexing coarse components of the second summing signals in units of wavelengths and distributes the coarse-multiplexed second summing signals to shared optical fibers. The dense optical signals refer to optical signals having a narrow wavelength interval and the coarse optical signals refer to optical signals having a wide wavelength interval.

The distribution device 220 demultiplexes, in units of wavelengths, summing signals and wireless wavelength-converted signals received from the centralization device 210 connected thereto by shared optical fibers (S1140). At step S1140, the distribution device 220 includes a plurality of distribution devices, namely, the first distribution device 222, the second distribution device 224 and the N-th distribution device 226. At step S1140, the distribution device 220 generates third summing signals by demultiplexing, in units of wavelengths, the coarse components of the coarse-multiplexed second summing signals distributed from shared optical fibers. The distribution device 220 generates fourth wireless summing signal by demultiplexing the dense components of the third summing signals in units of wavelengths.

The distribution device 220 transmits optical signals obtained by decomposing the summing signals to the wireless remote unit group 130 (S1150). At step S1150, the distribution device 220 transmits the optical signals obtained by decomposing the coarse-multiplexed second summing signals received from the centralization device 210 as second wireless optical signals, to the wireless remote unit group 130. At step S1150, the distribution device 220 receives fourth wireless summing signal of a high transmission rate and wavelength-converts and outputs the fourth wireless summing signal. The distribution device 220 generates the second wireless optical signals by decomposing the fourth wireless summing signal and wavelength-converts the second wireless optical signals into a low transmission rate.

The distribution device 220 transmits optical signals generated by wavelength-converting the wireless wavelength-converted signals to the wireless remote unit group 130 (S1160). At step S1160, the distribution device 220 generates the second wireless optical signals by wavelength-converting the wireless wavelength-converted signals. The distribution device 220 receives fourth wireless optical signals from the wavelength decomposition multiplexer. The distribution device 220 generates the second wireless optical signals by wavelength-converting the fourth wireless optical signals. The distribution device 220 transmits the second wireless optical signals to the wireless remote unit group 130.

Although steps S1110 to S1160 of FIG. 11 have been described as being sequentially performed, this is only an exemplary description of the technical idea of at least one embodiment of the present disclosure. Those skilled in the art will appreciate that various modifications, additions and substitutions are possible, without departing from the characteristics of at least one embodiment of the disclosure. For example, the order of steps shown in FIG. 11 may be changed, or one or more of steps S1110 to S1160 may be performed in parallel. Therefore, the present disclosure is not limited to the time-series order as shown in FIG. 11.

The optical fiber sharing method as described above and shown in FIG. 11 may be embodied as a program and stored in a computer-readable recording medium. The computer-readable recording medium storing the program for realizing the optical fiber sharing method according to at least one embodiment of the present disclosure may be any data storage device that can store data which can thereafter be read by a computer system. Examples of the computer-readable recording medium include ROMs, RAMs, CD-ROMs, magnetic tapes, floppy disks, optical data storage devices and carrier waves (such as data transmission through the Internet). The computer-readable recording medium may also be distributed over networks coupled to computer systems so that computer-readable code can be stored and executed in a distributed fashion. In addition, functional programs, codes and code segments for accomplishing at least one embodiment of the present disclosure may be easily construed by programmers skilled in the art to which the present disclosure pertains.

Figure 12:
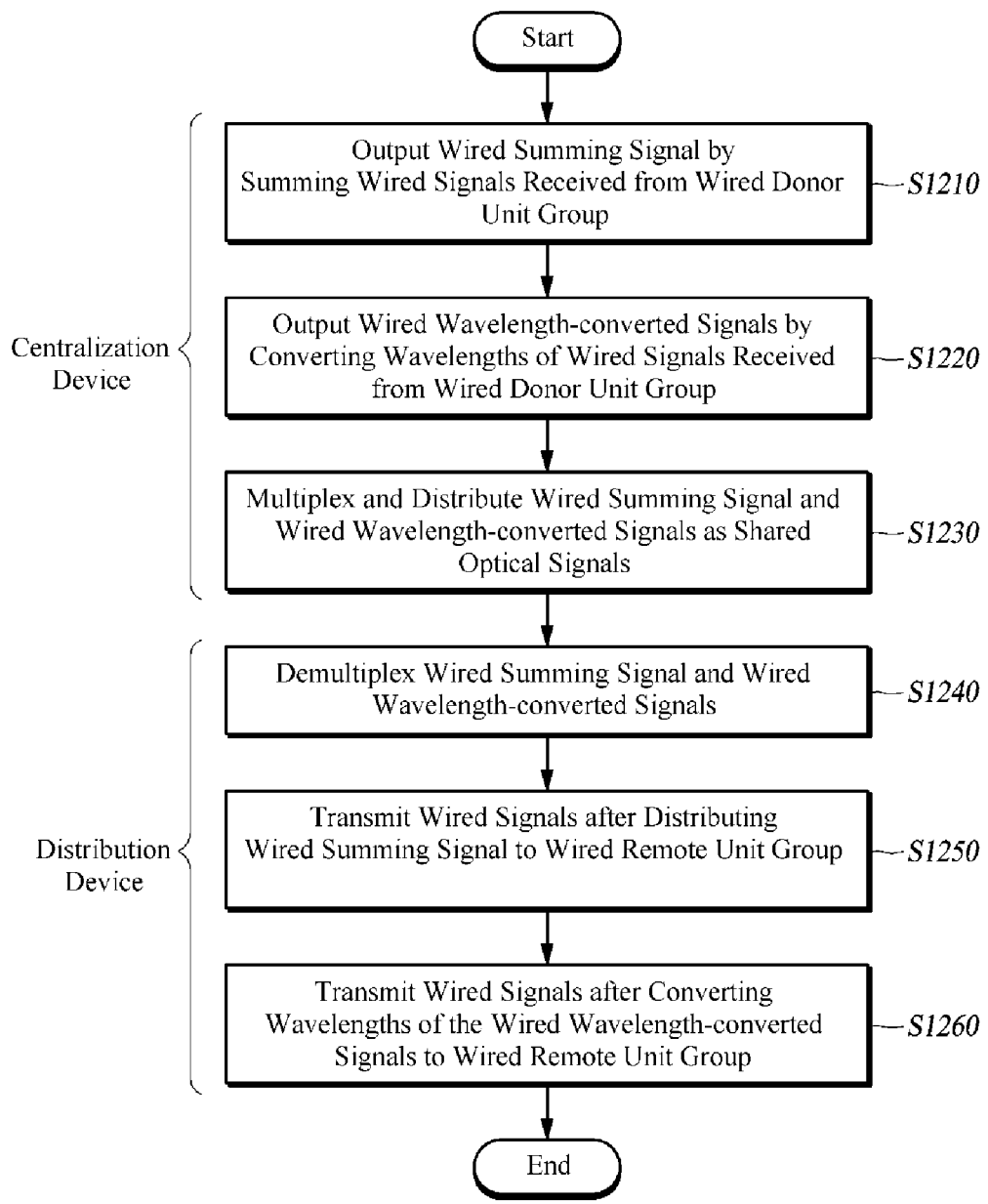
FIG. 12 is a flowchart of a wired optical fiber sharing method according to at least one embodiment of the present disclosure.

FIG. 12 is a flowchart of a wired optical fiber sharing method according to at least one embodiment of the present disclosure.

The centralization device 210 generates a wired summing signal by summing wired signals received from the wired donor unit group 112 (S1210). At step S1210, the centralization device 210 generates a first wired summing signal by summing first wired signals input from the wired donor unit group 112. At step S1210, the centralization device 210 receives first wired signals of a low transmission rate and wavelength-converts the first wired signals. The centralization device 210 generates the first wired summing signal by summing the first wired signals and then wavelength-converts and outputs the first wired summing signal. The centralization device 210 generates the first wired summing signal at a high transmission rate (S1220).

The centralization device 210 multiplexes the summing signal and wired wavelength-converted signals in units of wavelengths and distributes the summing signal and the wired wavelength-converted signals to the distribution device 220 connected thereto by shared optical fibers (S1230). At step S1230, the centralization device 210 distributes the summing signal and the wavelength-converted signals to N shared optical fibers by using an optical divider. At step S1230, the centralization device 210 generates second summing signals by multiplexing optical signals in units of dense wavelengths through the dense wavelength division multiplexer 520. The centralization device 210 generates coarse-multiplexed second summing signals by multiplexing the second summing signals and the optical signals in units of coarse wavelengths and distributes the coarse-multiplexed second summing signals to shared optical fibers. The dense wavelengths refer to wavelengths having a narrow interval and the coarse wavelengths refer to wavelengths having a wide interval.

The distribution device 220 demultiplexes, in units of wavelengths, either summing signals or wired wavelength-converted signals received from the centralization device 210 connected thereto by shared optical fibers (S1240). At step S1240, the distribution device 220 includes a plurality of distribution devices, namely, the first distribution device 222, the second distribution device 224 and the N-th distribution device 226. At step S1240, the distribution device 220 generates third summing signals by demultiplexing coarse components of the coarse-multiplexed second summing signals distributed by shared optical fibers. The distribution device 220 generates a fourth wired summing signal by demultiplexing dense components of the third summing signals in units of wavelengths.

The distribution device 220 transmits wired signals obtained by decomposing the summing signal to the wired remote unit group 132 (S1250). At step S1250, the distribution device 220 transmits second wired signals obtained by decomposing the coarse-multiplexed second summing signals received from the centralization device 210 to the wired remote unit group 132. At step S1250, the distribution device 220 receives the fourth wired summing signal of a high transmission rate and wavelength-converts and outputs the fourth wired summing signal. The distribution device 220 generates second wired signals by decomposing the fourth wired summing signal and wavelength-converts the second wired signals into a low transmission rate.

The distribution device 220 transmits wired signals obtained by wavelength-converting the wired wavelength-converted signals to the wired remote unit group 132 (S1260). At step S1260, the distribution device 220 generates second wired signals by wavelength-converting the wavelength-converted signals. The distribution device 220 receives fourth wired signals from a module for multiplexing the fourth wired signals by WDM and generates the second wired signals by wavelength-converting the fourth wired signals. The distribution device 220 transmits the second wired signals to the wired remote unit group 132.

Although steps S1210 to S1260 of FIG. 12 have been described as being sequentially performed, this is only an exemplary description of the technical idea of at least one embodiment of the present disclosure. Those skilled in the art will appreciate that various modifications, additions and substitutions are possible, without departing from the characteristics of at least one embodiment of the disclosure. For example, the order of steps shown in FIG. 12 may be changed, or one or more of steps S1210 to S1260 may be performed in parallel. Therefore, the present disclosure is not limited to the time-series order as shown in FIG. 12.

According to various embodiments of the present disclosure as described above, a summing signal generated by summing multi-channel wireless communication signals or wired communication signals; wavelength-converted signals generated by converting the wavelengths of the multi-channel wireless communication signals or the wired communication signals; and electro-optically converted signals generated by electro-optically converting the multi-channel wireless communication signals or the wired communication signals are transmitted from a centralization device to a distribution device group, using shared optical fibers connected between the centralized device and the distribution device group for a cloud service, thereby allocating the summing signal, the wavelength-converted signals, or the electro-optically converted signals to each device in the distribution device group.

In addition, according to various embodiments of the present disclosure as described above, a fast transmission rate is ensured since multiplexed signals are transmitted and received by using shared optical fibers between the centralization device and the distribution device group.

In addition, according to various embodiments of the present disclosure as described above, a traffic unbalance phenomenon between distribution devices in the distribution device group is handled in various ways and services are provided even when malfunction occurs on optical fibers.

The optical fiber sharing method as described above and shown in FIG. 12 may be embodied as a program and stored in a computer-readable recording medium. The computer-readable recording medium storing the program for realizing the optical fiber sharing method according to at least one embodiment of the present disclosure may be any data storage device that can store data which can thereafter be read by a computer system. Examples of the computer-readable recording medium include ROMs, RAMs, CD-ROMs, magnetic tapes, floppy disks, optical data storage devices and carrier waves (such as data transmission over the Internet). The computer-readable recording medium may also be distributed over networks coupled to computer systems so that computer-readable code can be stored and executed in a distributed fashion. In addition, functional programs, codes, and code segments for accomplishing at least one embodiment of the present disclosure may be easily construed by programmers skilled in the art to which the present disclosure pertains.

Although exemplary embodiments of the present disclosure have been described for illustrative purposes, those skilled in the art will appreciate that various modifications, additions and substitutions are possible, without departing from the characteristics of the disclosure. Therefore, exemplary embodiments of the present disclosure have been described for the sake of brevity and clarity. Accordingly, one of ordinary skill would understand the scope of the claimed invention is not limited by the explicitly described above embodiments but by the claims and equivalents thereof.

CROSS-REFERENCE TO RELATED APPLICATION

If applicable, this application claims priorities under 35 U.S.C §119(a) of Patent Application No. 10-2011-0096867, filed on Sep. 26, 2011 and Patent Application No. 10-2012-0081043, filed on Jul. 25, 2012 in Korea, the entire contents of which are incorporated herein by reference. In addition, this non-provisional application claims priorities in countries, other than the U.S., with the same reason based on the Korean Patent Applications, the entire contents of which are hereby incorporated by reference.

What is claimed is:

1. A system for delivering uplink signals and downlink signals between a plurality of donor units and a plurality of remote units in cloud-based radio access network (C-RAN), the system comprising:
   a centralization device connected to the plurality of donor units; and
   a plurality of distribution devices, each distribution device connected to a respective subset of the plurality of remote units,
   wherein the centralization device and the plurality of distribution devices are interconnected through optical fibers forming an optical ring network,
   wherein the centralization device is configured to
      receive a plurality of downlink signals from the plurality of donor units and
      optically transmit the plurality of downlink signals to the plurality of distribution devices at respective wavelengths assigned to the each distribution devices, and
   said each distribution device is configured to
      receive a plurality of uplink signals from the respective subset of the plurality of remote units and
      optically transmit the plurality of uplink signals to the centralization device at the assigned wavelengths, and
   wherein the plurality of donor units includes a plurality of wireless donor units and a plurality of wired donor units, and
   the plurality of remote units include a plurality of wireless remote units and a plurality of wired remote units,
   wherein the centralization device comprises
   a first transmission rate converter configured to
      receive downlink signals from a part of the plurality of donor units at low transmission rate,
      process the received downlink signals to generate summing signals, each summing signal carrying at least two downlink signals, and
      convert summing signals at different wavelengths to generate optical summing signals at high transmission rate,
      wherein the first transmission rate converter comprises
      a first wireless transmission rate converter configured to
         receive downlink signals from a part of the plurality of wireless donor units, and
         process the received downlink signals to generate summing signals, and
         convert the summing signals at different wavelengths to generate optical summing signals, and
      a first wired transmission rate converter configured to
         receive downlink signals from a part of the plurality of wired donor units,
         process the received downlink signals to generate summing signals, and
         convert the summing signals at different wavelengths to generate optical summing signals.

2. The system of claim 1, wherein the centralization device comprises
   a first wavelength division multiplexer, which is coupled to the first transmission rate converter and the first wavelength converter, configured to
      multiplex, using wavelength division multiplexing (WDM), the optical summing signals and the optical wavelength-converted signals to generate a multiplexed optical signal, and
      distribute the multiplexed optical signal to the optical ring network.

3. The system of claim 2, wherein the first wavelength division multiplexer comprises
   a first dense wavelength division multiplexer configured to
      multiplex, using dense wavelength division multiplexing (DWDM), a part of (i) the optical summing signals and (ii) the optical wavelength-converted signals to generate a first multiplexed optical signal, and
   a first coarse wavelength division multiplexer configured to
      multiplex, using coarse wavelength division multiplexing (CWDM), the first multiplexed optical signal and a rest of (i) the optical summing signals and (ii) the optical wavelength-converted signals to generate a second multiplexed optical signal, and
      distribute the second multiplexed optical signal to the optical fibers.

4. A system for delivering uplink signals and downlink signals between a plurality of donor units and a plurality of remote units in cloud-based radio access network (C-RAN), the system comprising:
   a centralization device connected to the plurality of donor units; and
   a plurality of distribution devices, each distribution device connected to a respective subset of the plurality of remote units,
   wherein the centralization device and the plurality of distribution devices are interconnected through optical fibers forming an optical ring network,
   wherein the centralization device is configured to
      receive a plurality of downlink signals from the plurality of donor units and
      optically transmit the plurality of downlink signals to the plurality of distribution devices at respective wavelengths assigned to the each distribution devices, and
   said each distribution device is configured to
      receive a plurality of uplink signals from the respective subset of the plurality of remote units and
      optically transmit the plurality of uplink signals to the centralization device at the assigned wavelengths, and
   wherein the plurality of donor units includes a plurality of wireless donor units and a plurality of wired donor units, and
   the plurality of remote units include a plurality of wireless remote units and a plurality of wired remote units, wherein the centralization device comprises
a first converter configured to:
receive downlink signals from a rest of the plurality of donor units; and
convert the received downlink signals at different wavelengths to generate optical wavelength-converted signals,
wherein the first converter comprises:
a first wavelength converter configured to
optically receive downlink signals from a rest of the plurality of wireless donor units, and
convert the received downlink signals at different wavelengths to generate optical wavelength-converted signals; and
a first electro-optical converter configured to
electrically receive downlink signals from a rest of the plurality of wired donor units, and
convert the received downlink signals at different wavelengths to generate optical wavelength-converted signals.

5. The system of claim 1, wherein said each distribution device comprises:
a second wavelength division multiplexer configured to
receive the multiplexed optical signal from the optical ring network, and
demultiplex, using wavelength division multiplexing (WDM), the multiplexed optical signal to generate the optical summing signals and the optical wavelength-converted signals;
a second transmission rate converter, which is coupled to the second wavelength division multiplexer, configured to
process the optical summing signals to generate at least two downlink signals, and
transmit the generated downlink signals to the corresponding remote unit group; and
a second wavelength converter, which is coupled to the second wavelength division multiplexer, configured to
convert the optical wavelength-converted signals into optical signals at predefined wavelength, and
transmit the generated downlink signals to the corresponding remote unit group.

6. A method performed by the system for delivering uplink signals and downlink signals between a plurality of donor units and a plurality of remote units in cloud-based radio access network (C-RAN), the method comprising:
receiving, by the centralization device, a plurality of downlink signals from the plurality of donor units at low transmission rates;
processing, by the centralization device, a part of the plurality of downlink signals to generate a plurality of summing signals, each summing signal carrying at least two downlink signals;
converting, by the centralization device, the plurality of summing signals at different wavelengths to generate a plurality of converted optical signals of high transmission rates, and convert a rest of the plurality of downlink signals at different wavelengths to generate a plurality of converted optical signals;
multiplexing, by the centralization device, the plurality of converted optical signals to generate a multiplexed optical signal;
distributing, by the centralization device, the multiplexed optical signal into the optical ring network;
receiving, by each distribution device, the multiplexed optical signal from the optical ring network;
demultiplexing, by each distribution device, the multiplexed optical signal to generate the plurality of converted optical signals;
processing, by each distribution device, optical signal of the wavelength associated with the summing signal to generate at least two downlink signals; and
transmitting, by each distribution device, a plurality of downlink signals to the respective subset of the plurality of remote units.

* * * * *